（12) United States Patent
Sato

(10) Patent No.: US 10,679,454 B2
(45) Date of Patent: Jun. 9, 2020

(54) OUTDOOR TERMINAL DEVICE

(71) Applicant: NEC Platforms, Ltd., Kawasaki-shi, Kanagawa (JP)

(72) Inventor: Junichi Sato, Kanagawa (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 0 days.

(21) Appl. No.: 16/067,448

(22) PCT Filed: Aug. 17, 2016

(86) PCT No.: PCT/JP2016/003755
§ 371 (c)(1),
(2) Date: Jun. 29, 2018

(87) PCT Pub. No.: WO2017/119016
PCT Pub. Date: Jul. 13, 2017

(65) Prior Publication Data
US 2019/0026972 A1    Jan. 24, 2019

(30) Foreign Application Priority Data

Jan. 5, 2016   (JP) ................................ 2016-000470

(51) Int. Cl.
*H05K 5/00*       (2006.01)
*G07F 9/02*       (2006.01)
(Continued)

(52) U.S. Cl.
CPC .......... *G07F 9/023* (2013.01); *G06Q 20/145* (2013.01); *G06Q 20/18* (2013.01); *G07F 9/10* (2013.01);
(Continued)

(58) Field of Classification Search
None
See application file for complete search history.

(56) References Cited

U.S. PATENT DOCUMENTS 7,044,367 B2 *   5/2006   Fockler .............. G06Q 20/1085
                                                      235/379
8,033,375 B2 *  10/2011   Doran .................... G06Q 20/10
                                                      194/205
(Continued)

FOREIGN PATENT DOCUMENTS

CN         1606041 A       4/2005
CN       204156299 U       2/2015
(Continued)

OTHER PUBLICATIONS

Japanese Office Action of JP 2016-000470 filed Mar. 10, 2017.
(Continued)

*Primary Examiner* — Courtney L Smith
*Assistant Examiner* — Rashen E Morrison
(74) *Attorney, Agent, or Firm* — Sughrue Mion, PLLC

(57) ABSTRACT

An outdoor terminal device is provided such that after performing an operation on a display with a touch panel, a user can perform an action associated with the operation by moving a hand without being hindered. The outdoor terminal device is equipped with a door having a display with a touch panel on a front surface of a case, and multiple internal units are housed inside the case. The door has panels in predetermined areas. The predetermined areas refer to areas excluding the display area and a function-securing area. An operation surface of the display with a touch panel and front surfaces of the panels are disposed on the same plane in a depth direction. No protruding object is present in a front surface area of the panels located between the operation surface of the display with a touch panel and the function-securing area disposed on an end part of the panels.

4 Claims, 22 Drawing Sheets

(51) Int. Cl.
    *G06Q 20/18*     (2012.01)
    *G07F 13/02*     (2006.01)
    *G06Q 20/14*     (2012.01)
    *G07F 9/10*     (2006.01)
    *G07F 15/00*     (2006.01)
    *H05K 5/02*     (2006.01)
    *G06F 3/041*     (2006.01)

(52) U.S. Cl.
    CPC .......... *G07F 13/025* (2013.01); *G07F 15/001* (2013.01); *H05K 5/0208* (2013.01); *G06F 3/041* (2013.01); *H05K 5/0221* (2013.01)

(56) References Cited

U.S. PATENT DOCUMENTS

| | | | |
|---|---|---|---|
| 9,235,945 B2* | 1/2016 | Martin | G07D 3/16 |
| 9,547,961 B2* | 1/2017 | Toepke | G07F 19/207 |
| 2004/0222290 A1* | 11/2004 | Fockler | G06Q 20/1085 |
| | | | 235/381 |
| 2016/0123051 A1 | 5/2016 | Sato et al. | |

FOREIGN PATENT DOCUMENTS

| | | |
|---|---|---|
| CN | 204515904 U | 7/2015 |
| EP | 2905755 A1 | 8/2015 |
| JP | 2003-085630 A | 3/2003 |
| JP | 2004-044980 A | 2/2004 |
| JP | 2006-039929 A | 2/2006 |
| JP | 2007-065792 A | 3/2007 |
| JP | 2007-065955 A | 3/2007 |
| JP | 2008-186198 A | 8/2008 |
| JP | 2011-123862 A | 6/2011 |
| JP | 2012-244709 A | 12/2012 |
| JP | 2015-014083 A | 1/2015 |
| JP | 2015-158083 A | 9/2015 |
| TW | 200813902 A | 3/2008 |

OTHER PUBLICATIONS

International Search Report of PCT/JP2016/003755 filed Oct. 4, 2016.
Translation of Office Action and Search Report dated Mar. 31, 2020, from the China National Intellectual Property Administration in Application No. 201680077906.0.

* cited by examiner

OUTDOOR TERMINAL DEVICE

This application is a National Stage of International Application No. PCT/JP2016/003755 filed Aug. 17, 2016, claiming priority based on Japanese Patent Application No. 2016-000470 filed Jan. 5, 2016, the disclosure of which is incorporated herein in its entirety by reference.

TECHNICAL FIELD

This invention relates to an outdoor terminal device to be installed outdoors, and more particularly, to an outdoor terminal device called an outdoor apparatus to be included in a system for gas stations.

BACKGROUND ART

An outdoor terminal device called an outdoor apparatus is known as one of apparatus constructing a system for gas stations. The outdoor apparatus is used to specify fueling conditions and the method of payment for a fuel charge, to pay the fuel charge, and for other purposes. The outdoor apparatus has a housing, which is seated in a special rack set up at a gas station when the outdoor apparatus is in use.

The housing of the outdoor apparatus has a substantially rectangular solid shape with six surfaces comprising a front surface, a back surface, a top surface, a bottom surface, a left side surface, and a right side surface. Of the six surfaces constructing the housing of the outdoor apparatus, the top surface, the bottom surface, the left side surface, the right side surface, and the back surface are surrounded by walls of the rack. Meanwhile, the front surface as one of the surfaces constructing the housing of the outdoor apparatus is exposed to a space in front of the rack. The front surface of the housing is normally provided with a single door or double doors lockable with door locking means. The door is provided with a touch panel display, a cash slot for bills and other forms of cash, a receipt slot, and the like.

The door is also provided with the door locking means mentioned above. The door is opened by a person permitted to open the door (hereinafter referred to as "access-granted person"), such as staff at the gas station, by unlocking the door locking means. With the door opened, the access-granted person accesses the interior of the outdoor apparatus to resupply receipt paper, collect cash accumulated in the housing, maintain or repair the outdoor apparatus, and perform other operations.

In Patent Document 1, there is disclosed an example of an outdoor apparatus as an apparatus included in a system for self-service gas stations. The example disclosed in Patent Document 1 is of an outdoor apparatus in which the front surface of the housing is provided with double doors (i.e., a pair of doors). A touch panel display, a receipt slot, an insertion slot to which a card or the like is inserted, and a human presence sensor are provided on one of the doors. A bill insertion slot, a two-dimensional barcode reading port at which a two-dimensional barcode printed on a receipt or the like is read, another insertion slot to which a card or the like is inserted, and an interphone are provided on the other door.

On the thus configured outdoor apparatus, a user first operates the touch panel display to specify fueling conditions and the method of payment of a fuel charge. The user then takes an action corresponding to the operation, such as the insertion of a bill or a card, by following instructions or other messages displayed on the display. In performing the operation, the user moves his/her hand away from an operation surface of the touch panel.

PRIOR ART DOCUMENTS

Patent Document

Patent Document 1: JP 2015-014083 A

SUMMARY OF THE INVENTION

Problem to be Solved by the Invention

In the outdoor apparatus disclosed in Patent Document 1, however, the two-dimensional barcode reading port housed in the outdoor apparatus is provided so as to jut out (forward) farther than the door surface. The outdoor apparatus disclosed in Patent Document 1 consequently has an inconvenience in that a user who is moving his/her hand to the bill insertion slot or another insertion slot for a card or the like accidentally bumps his/her hand or finger to the jut-out portion. When a user moves his/her hand after operating the touch panel with a bill or a card held in the hand, in particular, the bump of the user's hand or finger to the jut-out portion may cause the user to drop the bill or the card.

An outdoor apparatus with which, after operating the touch panel display, a user can move his/her hand without obstruction to take an action corresponding to the operation is therefore desired.

It is an object of this invention to provide an outdoor terminal device capable of solving the problem described above.

According to this invention, there is provided with an outdoor terminal device, which includes a door provided with a touch panel display on a front surface of a housing of the outdoor terminal device, and is configured to house therein a plurality of housed apparatus, wherein the door includes a panel in a predetermined area, wherein the predetermined area is an area excluding a display area and function securement areas, the display area being an area in which the touch panel display is provided, each of the function securement areas being required to partially expose at least one of the plurality of housed apparatus to the front surface of the housing so that the at least one of the plurality of housed apparatus is capable of implementing its function, wherein an operation surface of the touch panel display and a front surface of the panel are on the same plane in a depth direction of the outdoor terminal device, and wherein projection is free from being provided in a portion of the front surface of the panel between the operation surface of the touch panel display and the function securement areas provided in an end portion of the panel.

Effect of the Invention

According to this invention, an outdoor terminal device with which, after operating the touch panel display, a user can move his/her hand without obstruction to take an action corresponding to the operation can be provided.

MODE FOR CARRYING OUT THE INVENTION

An example embodiment of this invention will be described in detail below with reference to the drawings.

Referring to FIGS. 1 to 15, the description will proceed to an outdoor terminal device 100 according to a first example embodiment of this invention. The illustrated outdoor terminal device 100 comprises an outdoor apparatus installed outdoors, and comprises an apparatus included in a system for self-service gas stations at which a user pumps gas by himself/herself.

A Cartesian coordinate system (x, y, z) is used in FIGS. 1 to 15. In a state illustrated in FIGS. 1 to 15, the Cartesian coordinate system has the X-axis direction in a front-back direction (depth direction), the Y-axis direction in left-right direction (width direction), and the Z-axis direction in an up-down direction (height direction).

Figure 1:
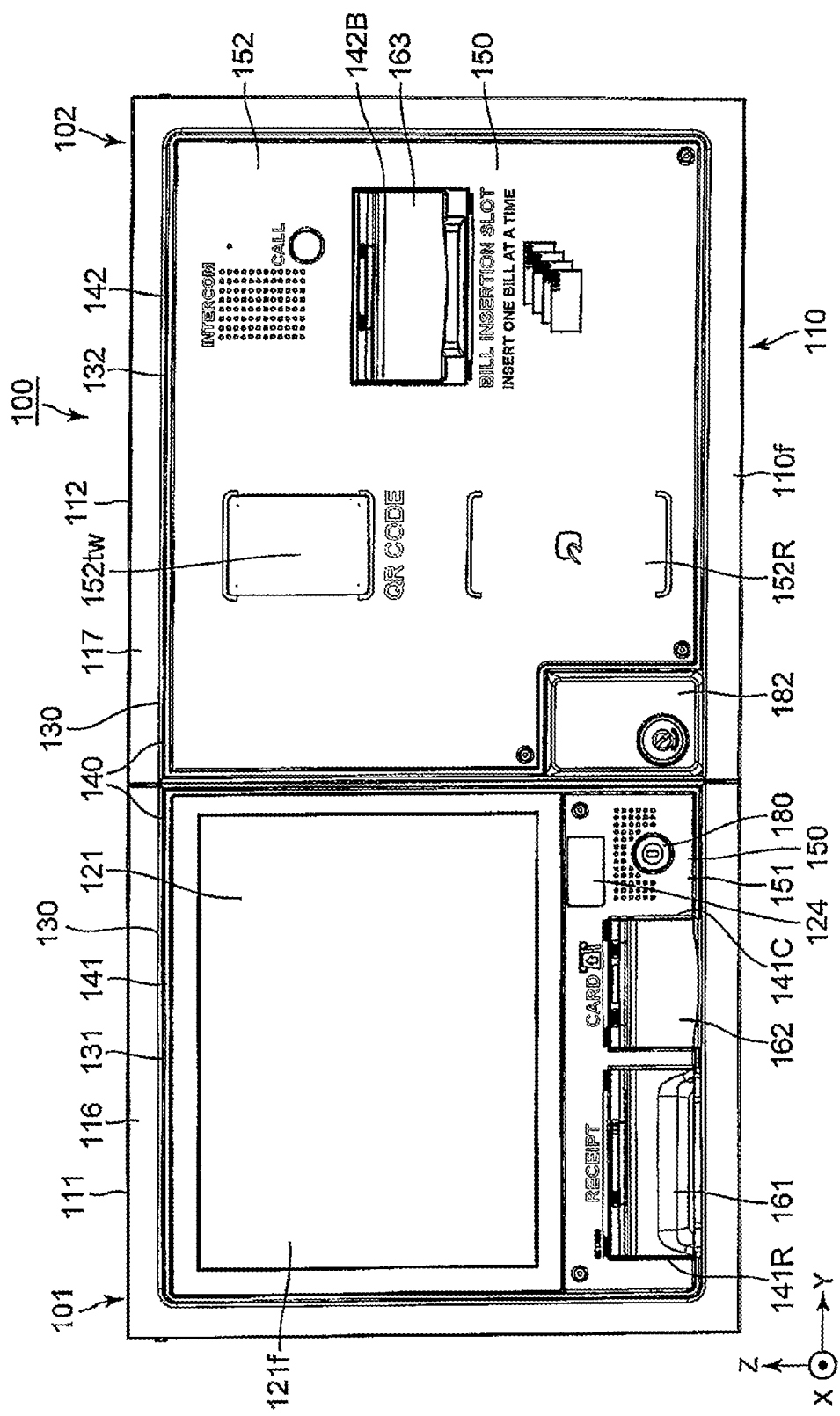
FIG. 1 is a front view of an outdoor terminal device (outdoor apparatus) according to a first example embodiment of this invention.

FIG. 1 is a front view of the outdoor apparatus 100. The outdoor apparatus 100 comprises a housing 110, which is shaped substantially like a rectangular solid. In other words, the housing 100 has six surfaces comprising a front surface, a back surface, a top surface, a bottom surface, a left side surface, and a right side surface. In FIG. 1, which is a front view of the outdoor apparatus 100, only a front surface 110f of the housing 110 is illustrated.

The housing 110 is seated in a special rack (not shown), which is set up at a self-service gas station, when the outdoor apparatus 100 is in use. The five surfaces out of the six surfaces of the outdoor apparatus 100, namely, the back surface, the top surface, the bottom surface, the left side surface, and the right side surface, are accordingly surrounded by solid walls of the rack. Meanwhile, the front surface 110f of the housing 110 of the outdoor apparatus 100 is exposed to a space in front of the rack. The housing 110 houses a plurality of housed apparatus inside as described later.

The outdoor apparatus 100 is divided (separated) into a first division unit (first separation unit) 101 and a second division unit (second separation unit) 102. In the example of FIG. 1, the first division unit 101 is disposed on the left side while the second division unit 102 is disposed on the right side. In other words, the outdoor apparatus 100 is configured by combining the first division unit 101 and the second division unit 102.

The housing 110 is divided (separated) into a first housing 111, which is included in the first division unit 101, and a second housing 112, which is included in the second division unit 102. The first housing 111 and the second housing 112, too, are each shaped substantially like a rectangular solid with six surfaces comprising a front surface, a back surface, a top surface, a bottom surface, a left side surface, and a right side surface.

The first housing 111 comprises a first frame 116 while the second housing 112 comprises a second frame 117. The first frame 116 and the second frame 117 are shaped substantially like a rectangular solid with an open front and five surfaces comprising a back surface, a top surface, a bottom surface, a left side surface, and a right side surface. The housing 110 is accordingly made up of the first housing 111 and the second housing 112 with the right side surface of the first frame 116 and the left side surface of the second frame 117 being in contact with each other.

The illustrated outdoor apparatus 100 comprises an outdoor apparatus having a double door 130 on the front surface 110*f* of the housing 110. The double door 130 here comprises a first door 131 and a second door 132.

In the example of FIG. 1, the first door 131 is disposed on the left side of the housing 100 while the second door 132 is disposed on the right side of the housing 100. Specifically, the first door 131 is provided on the open front of the first frame 116 and the second door 132 is provided on the open front of the second frame 117. Each of the first door 131 and the second door 132 is manufactured by press work of metal having high viscosity, for example, stainless steel or a plated steel sheet.

In short, the first housing 111 comprises the first frame 116 and the first door 131, and the second housing 112 comprises the second frame 117 and the second door 132.

A first base panel 141 is attached to the front surface of the first door 131 while a second base panel 142 is attached to the front surface of the second door 132. A first additional panel 151 is further attached to a lower end surface of the first base panel 141 while a second additional panel 152 is further attached to the front surface of the second base panel 142.

The first door 131 and the second door 132 are made of metal as described above. The first base panel 141, the second base panel 142, the first additional panel 151, and the second additional panel 152 are molded resin articles.

A combination of the first base panel 141 and the second base panel 142 is called a base panel 140. A combination of the first additional panel 151 and the second additional panel 152 is called an additional panel 150. The first base panel 141 and the first additional panel 151 are collectively called a first panel (141 and 151) for the first door 131. The second base panel 142 and the second additional panel 152 are collectively called a second panel (142 and 152) for the second door 132. The base panel 140 and the additional panel 150 are collectively simply called a panel (140 and 150). The door 130 thus includes the panel (140 and 150) in a predetermined area. The predetermined area will be described later.

Though not apparent in FIG. 1, the first base panel 141 and the second base panel 142 are molded resin articles colored in black, and are not transmissive of light. The first additional panel 151 and the second additional panel 152 are transparent molded resin articles. Black polyethylene terephthalate (PET) films are formed on surfaces of the first additional panel 151 and the second additional panel 152 by insert molding in order to prevent the transmission of light except in light-transmissive portions described later.

A receipt slot 141R and a magnetic card insertion slot 141C are provided in a lower end portion of the first base panel 141. A bill insertion slot 142B is provided in a right edge portion of the second base panel 142. A first cover 161 and a second cover 162, which are transparent and made of resin, are attached to the first base panel 141 in a manner that allows the covers to turn while covering the receipt slot 141R and the magnetic card insertion slot 141C, respectively. A third cover 163, which is transparent and made of resin, is attached to the second base panel 142 in a manner that allows the cover to turn while covering the bill insertion slot 142B.

A lock 180 is provided in a right lower end portion of the first door 131 in a state where the first door 131 is closed. An antitheft lock 182 is provided in a left lower end portion of the second door 132 in a state where the second door 132 is closed.

Figure 2:
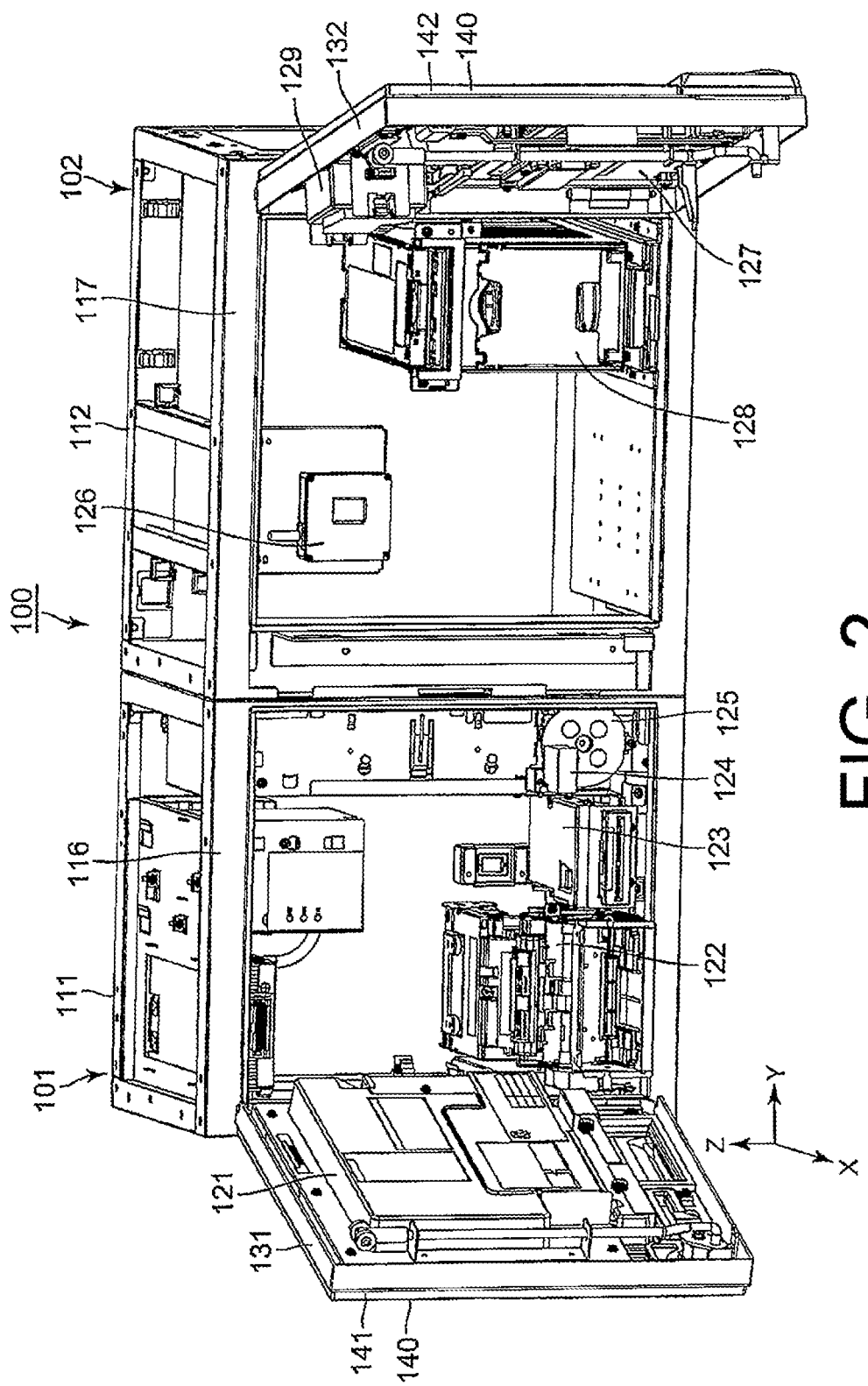
FIG. 2 is a perspective view for illustrating the outdoor terminal device (outdoor apparatus) illustrated in FIG. 1 with its doors opened.

FIG. 2 is a diagram for illustrating the outdoor apparatus 100 with the double doors 130 opened. As described above, the housing 110 of the outdoor apparatus 100 is configured by combining the first housing 111 including the first frame 116 with the second housing 112 including the second frame 117. The first door 131 is attached to the first frame 116 in a manner that allows the first door 131 to turn while the second door 132 is attached to the second frame 117 in a manner that allows the second door 132 to turn.

To give a more detailed description, a first hinge mechanism (not shown) is provided in a front left edge portion of the first frame 116. The first door 131 is joined to the first frame 116 with the first hinge mechanism in a manner that allows the first door 131 to turn. A second hinge mechanism (not shown) is provided in a front right edge portion of the second frame 117. The second door 132 is joined to the second frame 117 with the second hinge mechanism in a manner that allows the second door 132 to turn.

In short, the first housing 111 comprises the first frame 116, the first hinge mechanism, and the first door 131. The second housing 112 comprises the second frame 117, the second hinge mechanism, and the second door 132.

The outdoor apparatus 100 houses the following plurality of housed apparatus inside the first door 131 (i.e., in the interior of the first housing 111). Specifically, the plurality of housed apparatus housed in the first housing 111 comprise a touch panel display 121, a receipt printer 122, a magnetic card reader 123, a human presence sensor 124, and a speaker 125. The lock 180, which will be described later, is a housed apparatus housed in the first housing 111 as well.

In short, the first division unit 101 comprises the first housing 111 and the plurality of housed apparatus 121 to 125 housed in the first housing 111.

Meanwhile, the outdoor apparatus 100 houses the following plurality of housed apparatus inside the second door 132 (i.e., in the interior of the second housing 112). Specifically, the plurality of housed apparatuses housed in the second housing 112 comprises a two-dimensional barcode reader 126, a contactless IC card reader/writer 127, a bill receiving apparatus 128, and an intercom 129. The antitheft lock 182, which will be described later, is a housed apparatus housed in the second housing 112 as well.

In short, the second division unit 102 comprises the second housing 112 and the plurality of housed apparatuses 126 to 129 housed in the second housing 112.

Figure 3:
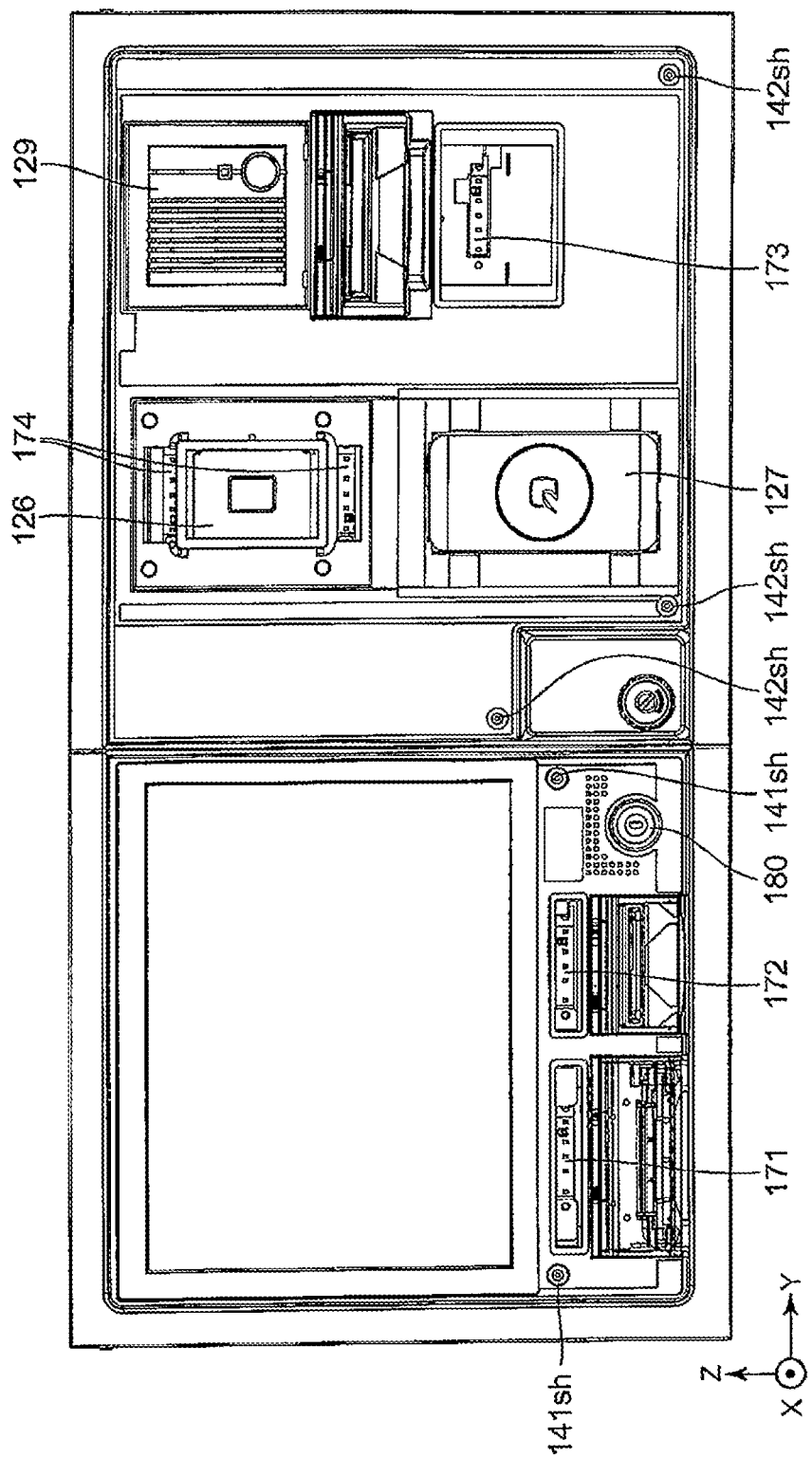
FIG. 3 is a front view for illustrating the outdoor terminal device (outdoor apparatus) illustrated in FIG. 1 with a first additional panel and a second additional panel detached.
Figure 4:
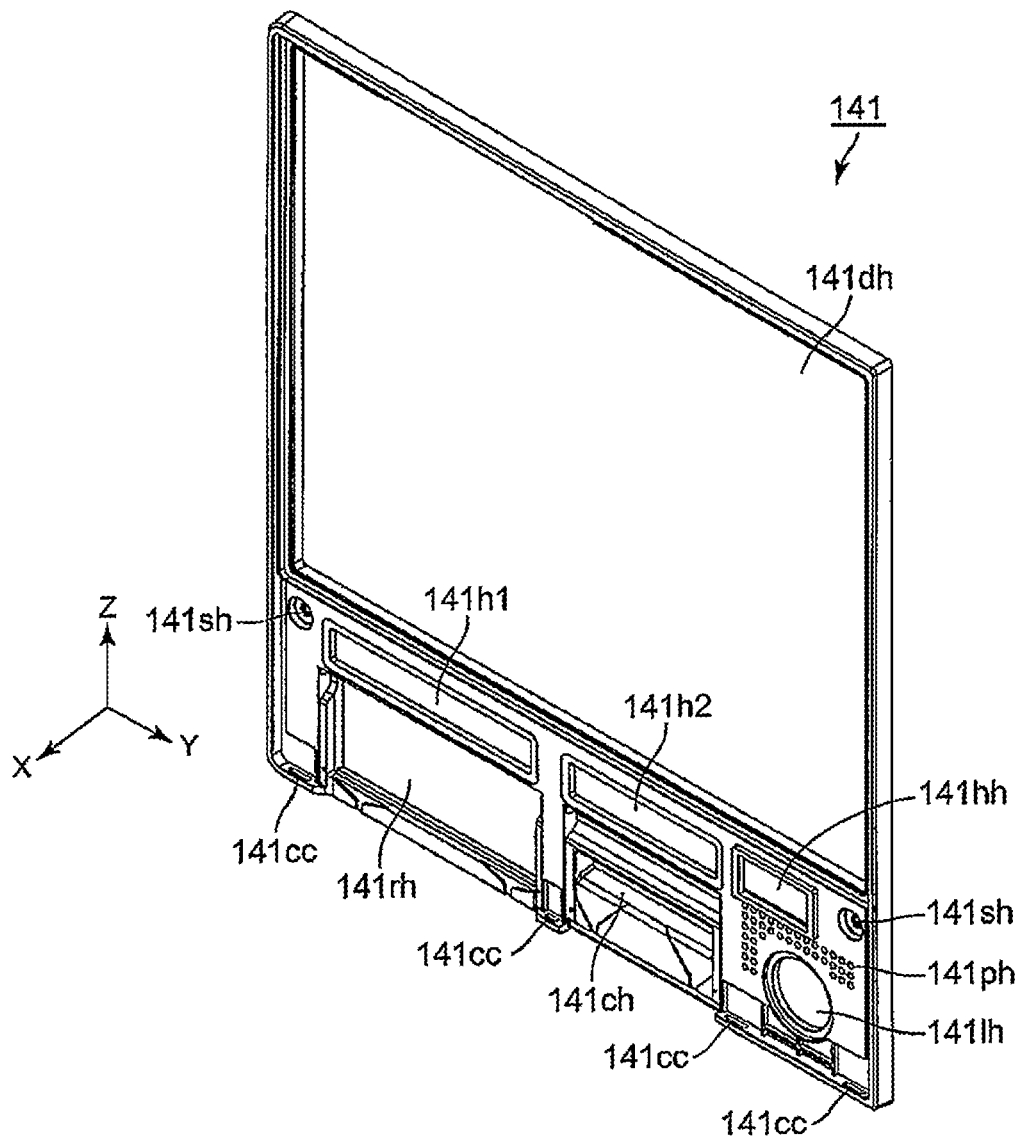
FIG. 4 is a perspective view of a first base panel, which is used in the outdoor terminal device (outdoor apparatus) illustrated in FIG. 1, viewed from the front side.
Figure 6:
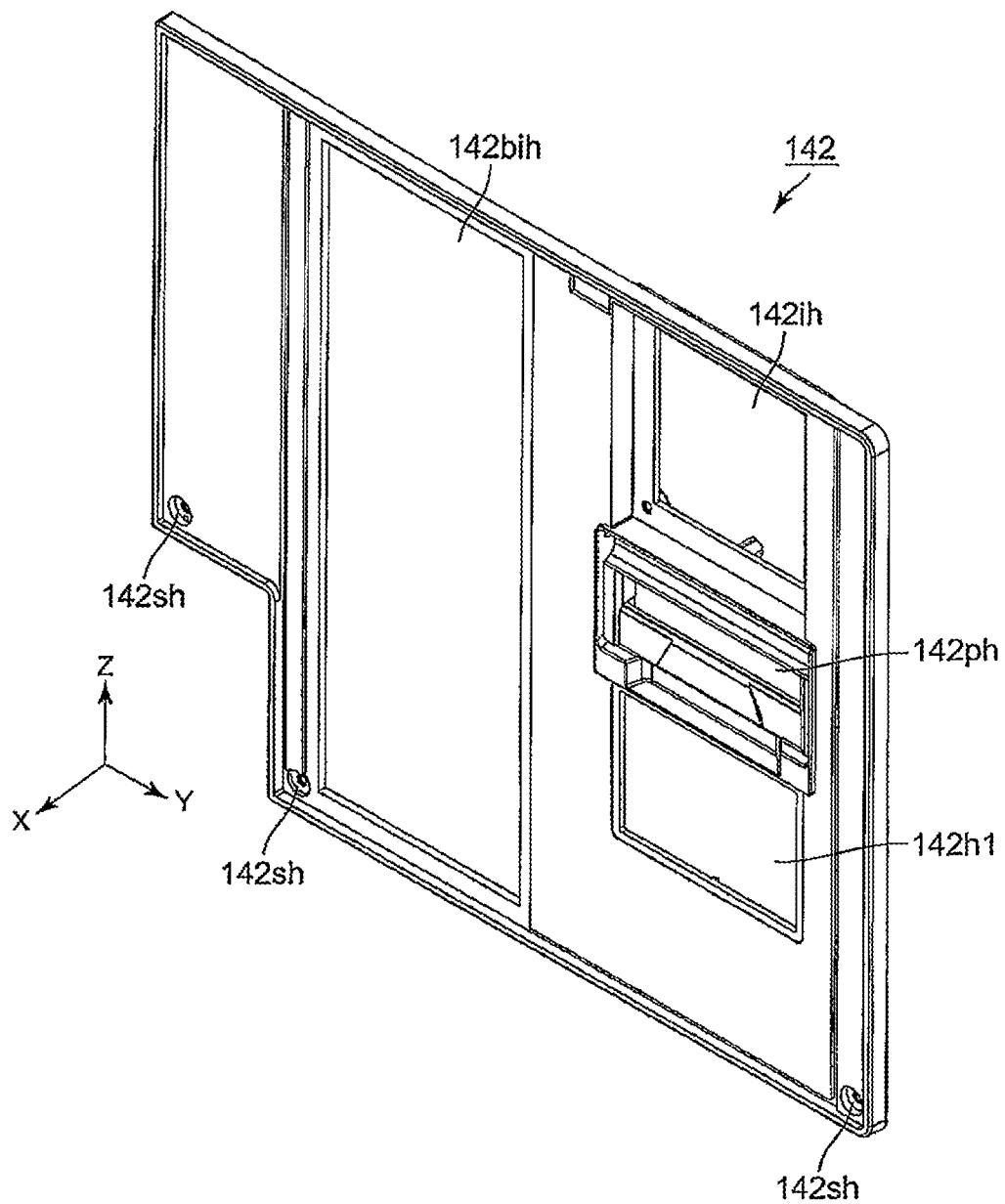
FIG. 6 is a perspective view of a second base panel, which is used in the outdoor terminal device (outdoor apparatus) illustrated in FIG. 1, viewed from the front side.
Figure 8:
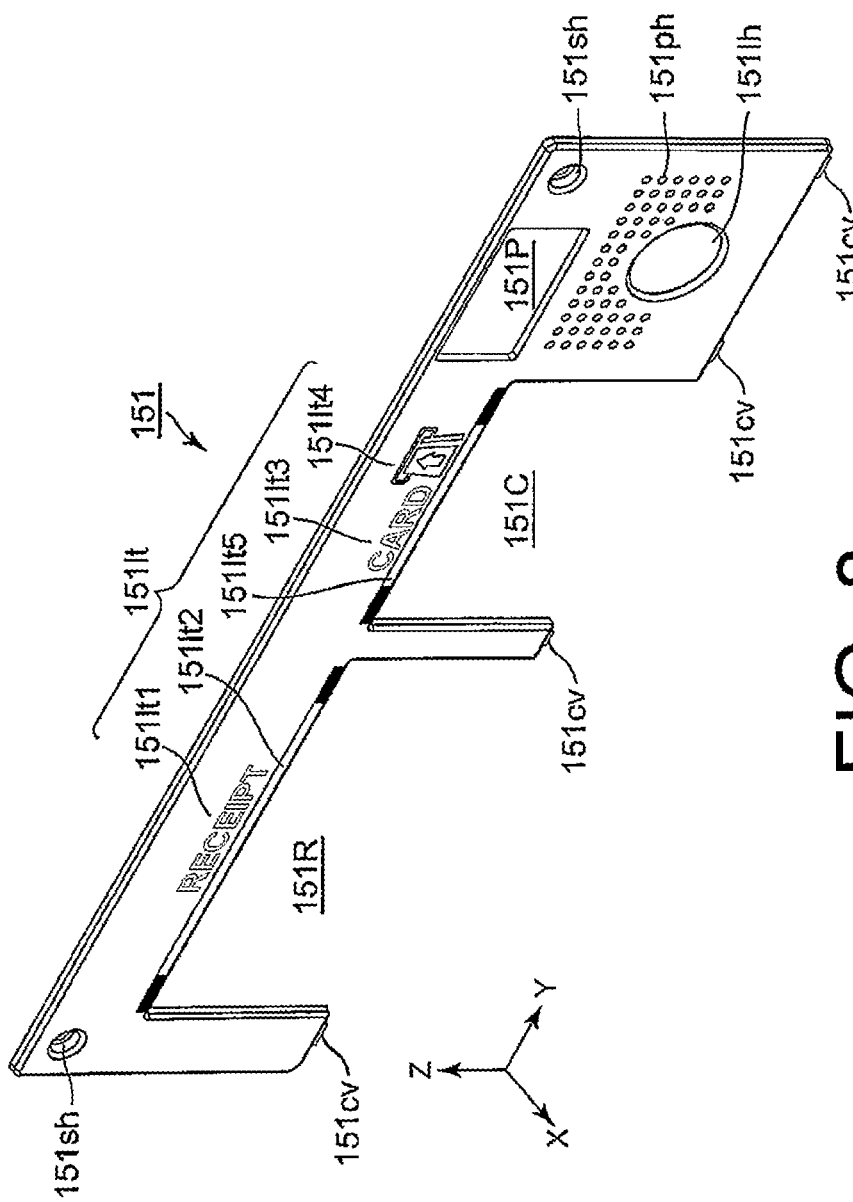
FIG. 8 is a perspective view of the first additional panel, which is used in the outdoor terminal device (outdoor apparatus) illustrated in FIG. 1, viewed from the front side.
Figure 10:
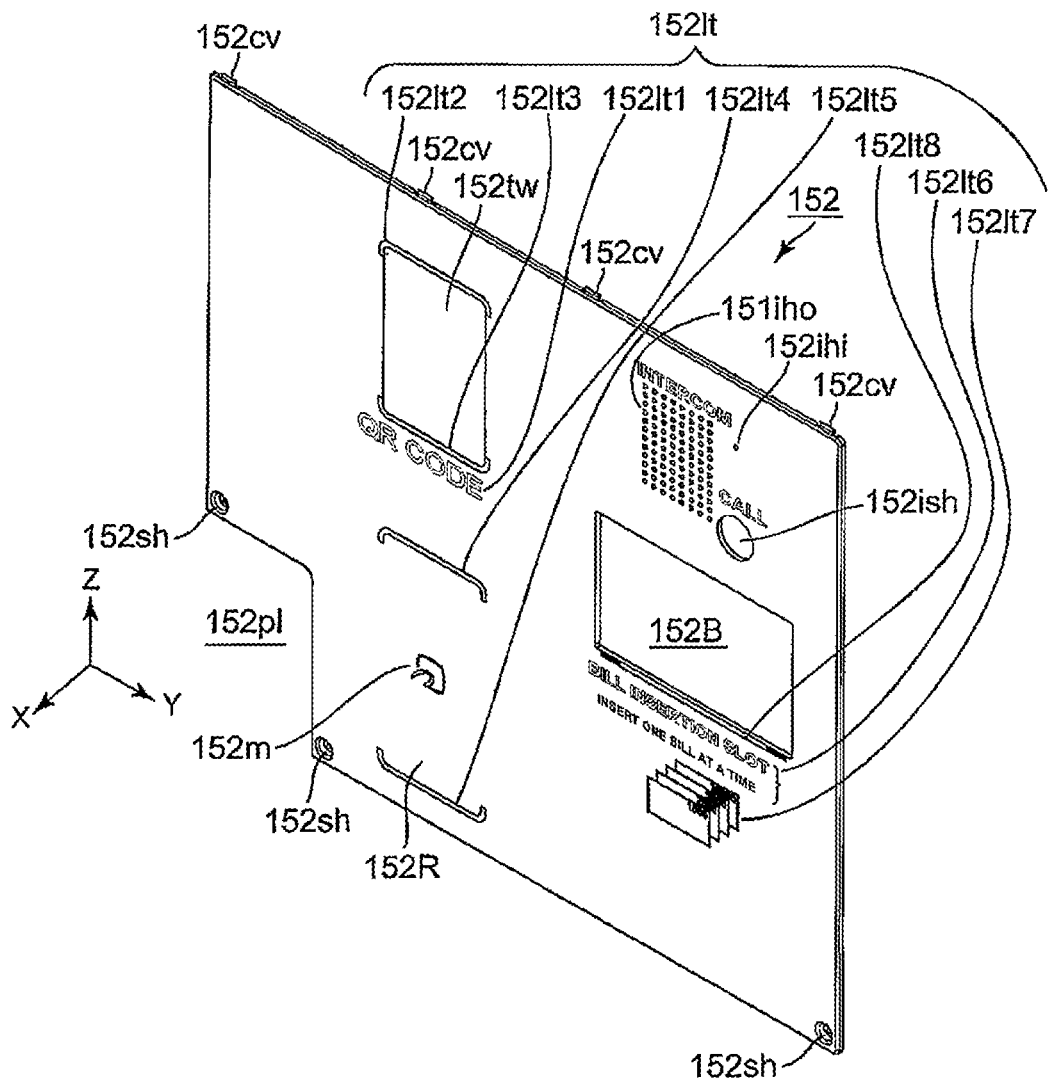
FIG. 10 is a perspective view of the second additional panel, which is used in the outdoor terminal device (outdoor apparatus) illustrated in FIG. 1, viewed from the front side.

FIG. 3 is a front view for illustrating the outdoor apparatus 100 with the additional panel 150 detached. FIG. 4 is a perspective view of the first base panel 141 viewed from the front side. FIG. 6 is a perspective view of the second base panel 142 viewed from the front side. FIG. 8 is a perspective view of the first additional panel 151 viewed from the front side. FIG. 10 is a perspective view of the second additional panel 152 viewed from the front side.

Referring to FIG. 3 and FIGS. 4 and 8 as well, the description will first proceed to the relation between the first additional panel 151 and the first base panel 141. The first additional panel 151 is attached to the first base panel 141 by engaging engagement projection portions 151*cv* (see FIG. 8), which are provided in four places, to recessed portions 141*cc* (see FIG. 4), which are provided in four places in the first base panel 141, and by fastening the first additional panel 151 with screws in threaded holes 141*sh*, which are formed in two places. A first hole portion 141*h*1 and a second hole portion 141*h*2 (see FIG. 4) through which light is transmitted are formed in portions of the first base panel 141 above the receipt slot 141R and the magnetic card insertion slot 141C, respectively. A light emission unit (a light emission unit 171 for the receipt printer) including a light emitting diode (LED) is provided at the back of the first hole portion 141h1. A light emission unit (a light emission unit 172 for the magnetic card reader) including a light emitting diode (LED) is provided at the back of the second hole portion 141h2. Transparent films are stuck for waterproofing to the hole portions through which light is transmitted.

Referring to FIG. 3 and FIGS. 6 and 10 as well, the description will next proceed to the relation between the second additional panel 152 and the second base panel 142. The second additional panel 152 is attached to the second base panel 142 by engaging engagement projection portions 152cv (see FIG. 10), which are provided in four places, to recessed portions (not shown), which are provided in four places in the second base panel 142, and by fastening the second additional panel 152 with screws in threaded holes 142sh, which are formed in three places. A hole portion 142h1 (see FIG. 6) through which light is transmitted is formed in a portion of the second base panel 142 below the bill insertion slot 142B. A light emission unit 173 for the bill receiving apparatus including an LED is provided at the back of the hole portion 142h1. A transparent film is stuck for waterproofing to the hole portion through which light is transmitted.

As illustrated in FIG. 3, the two-dimensional barcode reader 126, a light emission unit 174 for the two-dimensional barcode reader, the contactless IC card reader/writer 127, and the intercom 129 are in view with the second additional panel 152 detached. The two-dimensional barcode reader 126 and the contactless IC card reader/writer 127 are housed in a frame to which a transparent film is stuck for waterproofing.

Figure 5:
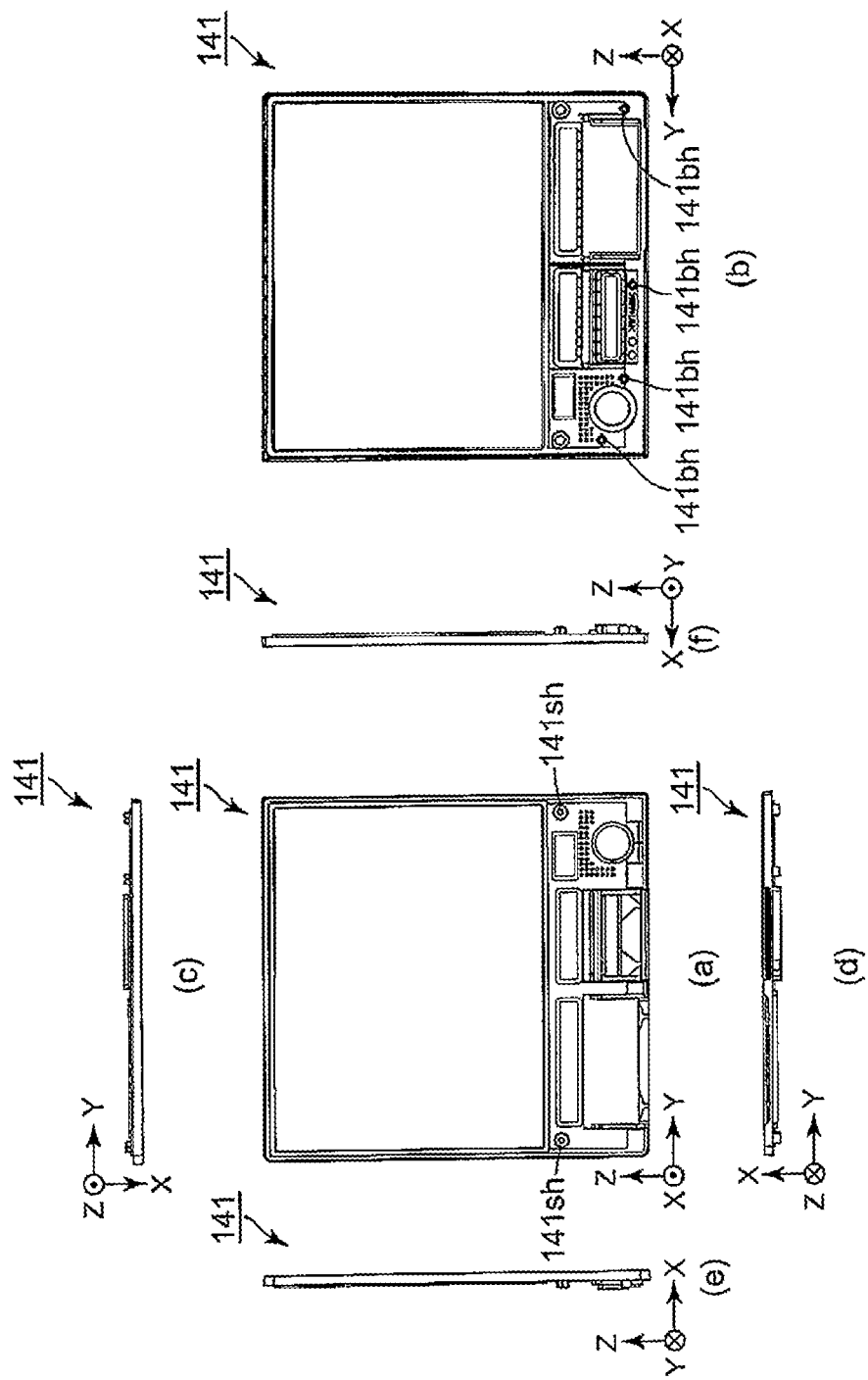
FIGS. 5 includes (a), (b), (c), (d), (e), and (f) which are a front view, rear view, top view, bottom view, left side view, and right side view of the first base panel illustrated in FIG. 4, respectively.

FIG. 4 is a perspective view of the first base panel 141. In FIG. 5, (a), (b), (c), (d), (e), and (f) are a front view, back view, top view, bottom view, left side view, and right side view of the first base panel 141, respectively.

The first base panel 141 is attached to the first door 131 by fastening the first base panel 141 with screws in threaded holes 141bh (in four places) from the rear side of the first door 131 (see FIG. 5 (b)). The first base panel 141 has a hole portion 141dh for the touch panel display, a hole portion 141rh for the receipt slot, a hole portion 141ch for the magnetic card insertion slot, the first hole portion 141h1 for the receipt printer light emitting unit, the second hole portion 141h2 for the light emission unit for the magnetic card reader, a hole portion 141hh for the human presence sensor, a hole portion 141ph for the speaker, and a hole portion 141lh for the lock.

The first base panel 141 also has the recessed portions 141cc for engaging the first additional panel in four places and the screw holes 141sh for fastening with screws in two places as described above.

Figure 7:
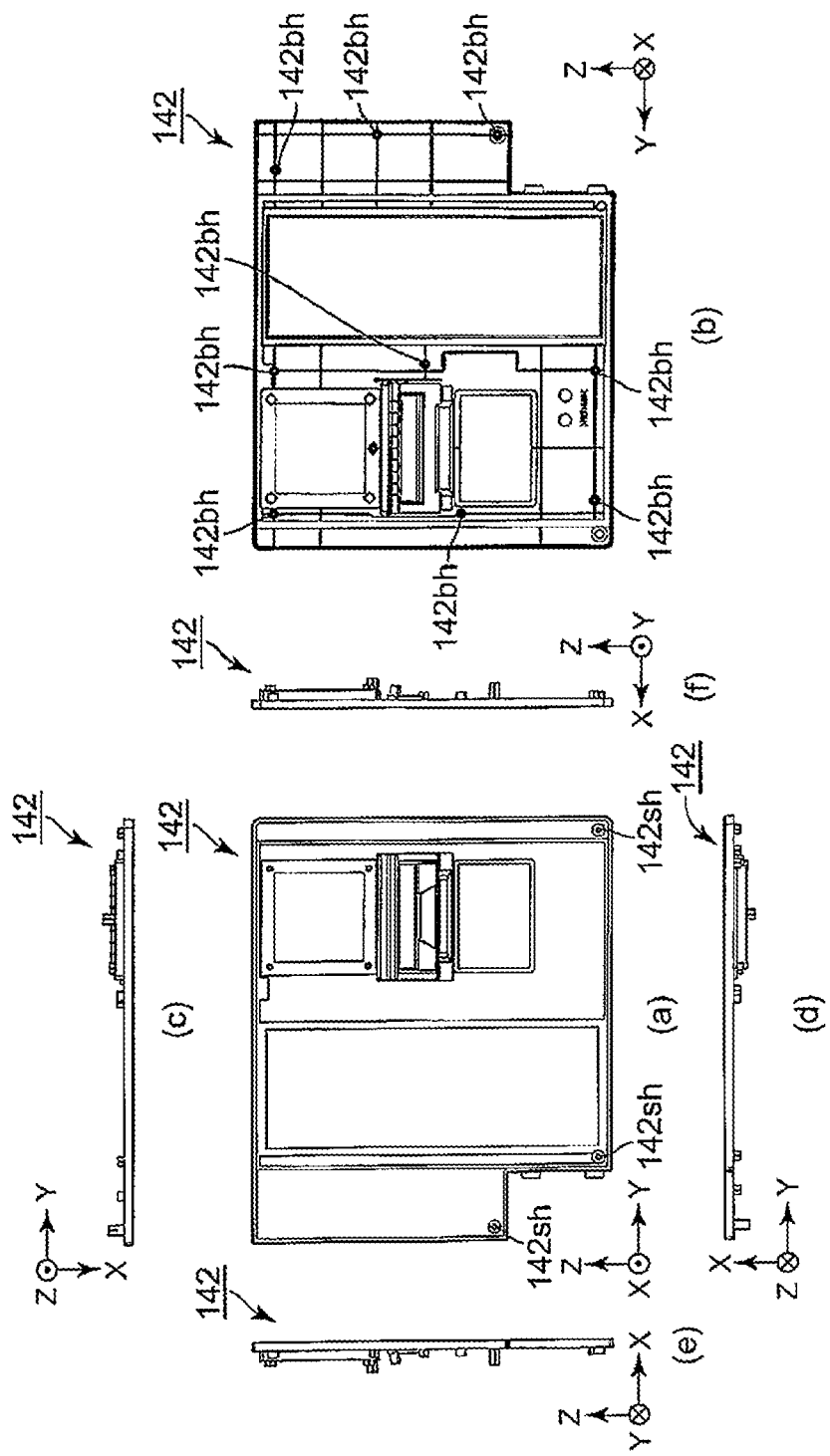
FIGS. 7 includes (a), (b), (c), (d), (e), and (f) which are a front view, rear view, top view, bottom view, left side view, and right side view of the second base panel illustrated in FIG. 6, respectively.

FIG. 6 is a perspective view of the second base panel 142. In FIG. 7, (a), (b), (c), (d), (e), and (f) are a front view, back view, top view, bottom view, left side view, and right side view of the second base panel 142, respectively.

The second base panel 142 is attached to the second door 132 by fastening the second base panel 142 with screws in threaded holes 142bh (in nine places) from the rear side of the second door 132 (see FIG. 7 (b)). The second base panel 142 has a hole portion 142bih for the two-dimensional barcode reader and the contactless IC card reader/writer, a hole portion 142ph for the bill insertion slot, the hole portion 142h1 for the light emission unit for the bill receiving apparatus, and a hole portion 142ih for the interphone.

The second base panel 142 also has the recessed portions (not shown) for engaging the second additional panel in four places and the threaded holes 142sh for fastening with screws in three places as described above. One of the threaded holes 142sh is formed in the same place as one of the threaded holes 142bh on the rear side.

Figure 9:
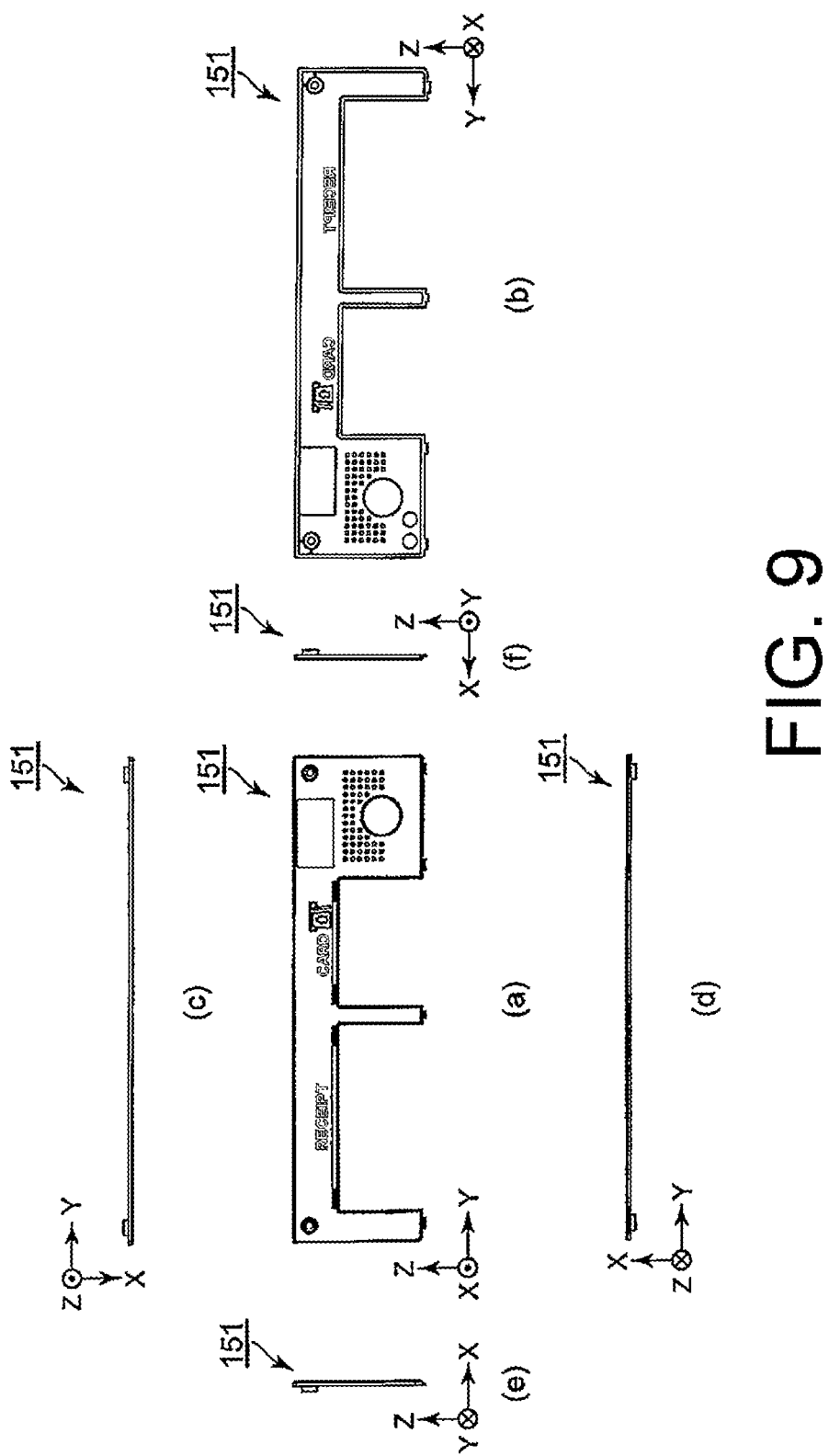
FIGS. 9 includes (a), (b), (c), (d), (e), and (f) which are a front view, rear view, top view, bottom view, left side view, and right side view of the first additional panel illustrated in FIG. 8, respectively.

FIG. 8 is a perspective view of the first additional panel 151. In FIG. 9, (a), (b), (c), (d), (e), and (f) are a front view, back view, top view, bottom view, left side view, and right side view of the additional base panel 151, respectively.

Portions corresponding to the receipt slot 141R and the magnetic card insertion slot 141C of the first base panel 141 are cut off from the first additional panel 151. Specifically, a portion 151R of the first additional panel 151 corresponding to the receipt slot 141R is a first function securement area, which is required to partially expose the receipt printer 122 (see FIG. 2) to a space in front of the door surface so that the receipt printer 122 as one of the housed apparatus can implement its function (execute requested processing) under control of a control unit of the outdoor apparatus 100. A portion 151C of the first additional panel 151 corresponding to the magnetic card insertion slot 141C is a second function securement area, which is required to partially expose the magnetic card reader 123 (see FIG. 2) so that the magnetic card reader 123 as one of the housed apparatus can implement its function (execute requested processing) under control of the control unit of the outdoor apparatus 100.

A portion 151P corresponding to the human presence sensor 124 (see FIG. 2) is also cut off from the first additional panel 151, and a plurality of holes 151ph are formed in the first additional panel 151 to produce voice of the speaker 125 (see FIG. 2). The areas 151P and 151ph are a third function securement area and a fourth function securement area, which are required to partially expose the human presence sensor 124 and the speaker 125 so that the human presence sensor 124 and the speaker 125 can implement their functions (execute requested processing), respectively.

A portion 151lh corresponding to a key slot of the lock 180 (see FIG. 1) is also cut off from the first additional panel 151. The area 151lh is a fifth function securement area, which is required to partially expose the lock 180 so that the lock 180 can implement its mechanical function. When the lock 180 is unlocked, only the first door 131 can be opened.

The first additional panel 151 also has the engagement projection portions 151cv, which are formed in four places for engagement to the first base panel 141 as described above, and holes 151sh, which are formed in two places for fastening with screws.

Though not apparent in FIG. 8 and FIG. 9 (a) to (f), the first additional panel 151 is made of a transparent molded resin article. A black polyethylene terephthalate (PET) film is formed on a surface of the first additional panel 151 by insert molding in order to prevent the transmission of light except in light-transmissive portions 151lt, which will be described later. In other words, the surface of the first additional panel 151 except the light-transmissive portions 151lt described later is covered with a black PET film.

The light-transmissive portions 151lt comprise, as illustrated in FIG. 8, a portion 151lt1 for letters "RECEIPT", a linear portion 151lt2 below the letters "RECEIPT", a portion 151lt3 for letters "CARD", a portion 151lt4 for an image depicting how a card is inserted, and a linear portion 151lt5 below the letters "CARD". Light diffusion printing is performed on the portions 151lt1 to 151lt5. In two end portions (portions illustrated in black) in each of the liner portion 151lt2 below the letters "RECEIPT" and the linear portion 151*lt*5 below the letters "CARD", black PET films are formed by insert molding so as to gradually decrease the amount of transmitted light.

Figure 11:
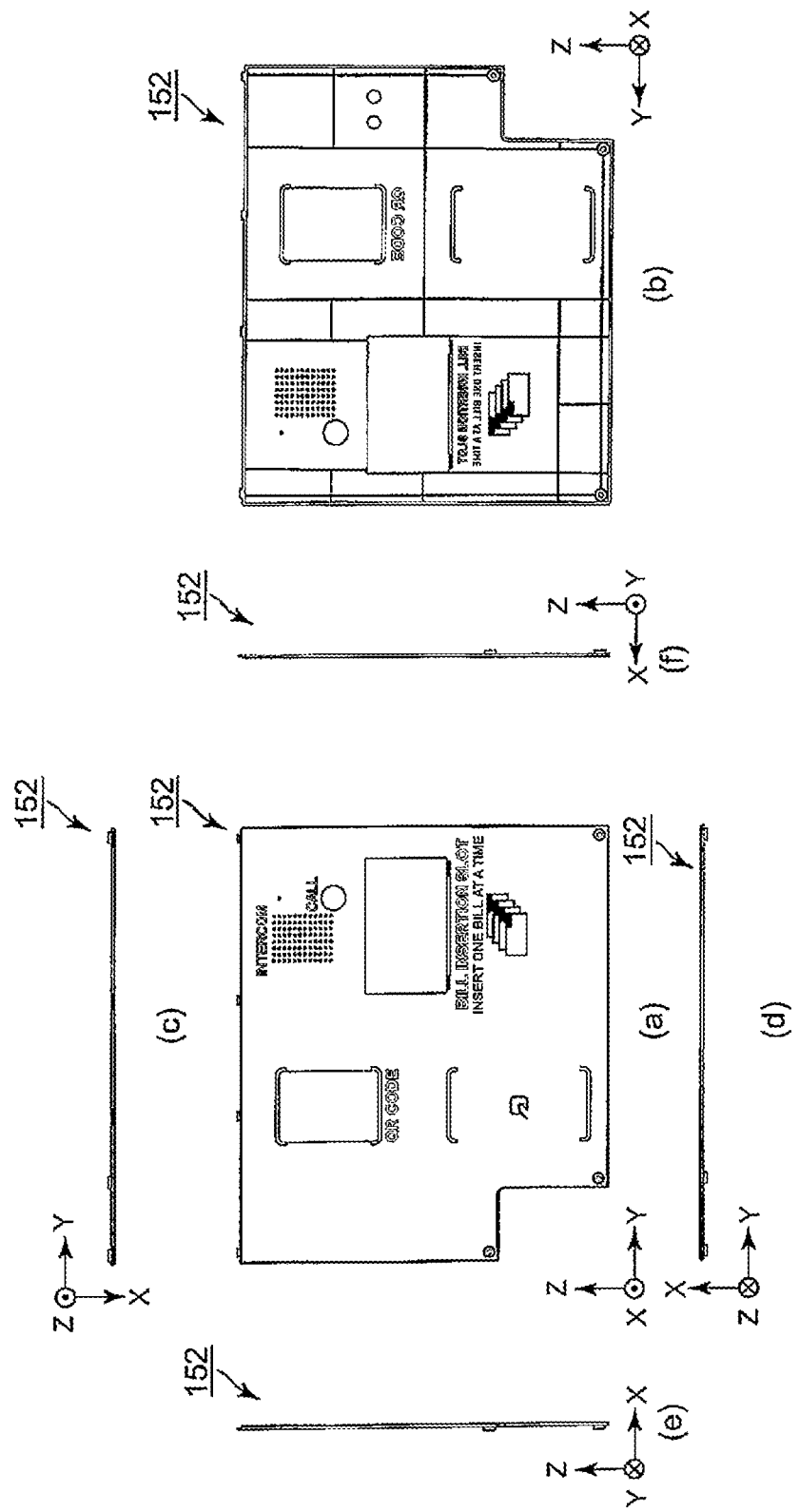
FIGS. 11 includes (a), (b), (c), (d), (e), and (f) which are a front view, rear view, top view, bottom view, left side view, and right side view of the second additional panel illustrated in FIG. 10, respectively.

FIG. 10 is a perspective view of the second additional panel 152. In FIG. 11, (a), (b), (c), (d), (e), and (f) are a front view, back view, top view, bottom view, left side view, and right side view of the second additional panel 152, respectively.

A portion 152*p*1, in which the antitheft lock 182 (see FIG. 1) is positioned, and a portion 152B corresponding to the bill insertion slot 142B (see FIG. 1) are cut off from the second additional panel 152. Specifically, the portion 152B corresponding to the bill insertion slot 142B is a sixth function securement area, which is required to partially expose the bill receiving apparatus 128 (see FIG. 2) on the door surface so that the bill receiving apparatus 128 as one of the housed apparatus can implement its function (execute requested processing) under control of the control unit of the outdoor apparatus 100.

A portion 152*ish* corresponding to a switch of the intercom 129 (see FIG. 2) is also cut off from the second additional panel 152, and a hole 152*ihi* for voice input and a plurality of holes 152*iho* for voice output are formed in the second additional panel 152. The areas 152*ish*, 152*ihi*, and 152*iho* are a seventh function securement area, which is required to partially expose the interphone 129 so that the intercom 129 can implement its function. The second additional panel 152 is shaped so as to have the portion (area) 152*p*1 described above in order to avoid covering a key slot of the antitheft lock 182. The area 152*p*1 is an eighth function securement area, which is required to partially expose the antitheft lock 182 so that the antitheft lock 182 can implement its mechanical function. The predetermined area mentioned above as areas in the door 130 on which the panel (140 and 150) are provided comprises accordingly an area excluding a display area, in which the touch panel display 121 is provided, and the function securement areas (151R, 151C, 151P, 151*ph*, 151*lh*, 152B, 152*ish*, 152*ihi*, 152*iho*, and 152*p*1) required to partially expose at least one housed apparatus (122, 123, 124, 125, 180, 128, 129, or 182) out of the plurality of housed apparatus (122, 123, 124, 125, 126, 127, 180, 128, 129, and 182) to a space in front of the housing 110 so that the at least one housed apparatus (122, 123, 124, 125, 180, 128, 129, or 182) out of the plurality of housed apparatus can implement its function.

When the antitheft lock 182 is unlocked, only the second door 132 can be opened. The antitheft lock 182 has a more solid structure than that of the lock 180 described above because the second housing 112 houses the bill receiving apparatus 128.

In the second additional panel 152, only a transparent window 152*tw*, through which a two-dimensional barcode is read, is formed in a portion corresponding to the two-dimensional barcode reader 126, which is not required to be partially exposed. Similarly, only a mark 152*m* indicative of a place above which a contactless IC card is to be held is printed in white in a portion 152R of the second additional panel 152 (a reading surface 152R) corresponding to the contactless IC card reader/writer 127, which is not required to be partially exposed.

The second additional panel 152 also has the engagement projection portions 152*cv*, which are formed in four places for engagement to the second base panel 142 as described above, and holes 152*sh*, which are formed in three places for fastening with screws.

Though not apparent in FIG. 10 and FIGS. 11 (a) to (f), the second additional panel 152 is made of a transparent molded resin article. A black polyethylene terephthalate (PET) film is formed on a surface of the second additional panel 152 by insert molding in order to prevent the transmission of light except in light-transmissive portions 152*lt*, which will be described later. In other words, a surface of the second attached panel 152 except the light-transmissive portions 152*lt* described later is covered with a black PET film.

The light-transmissive portions 152*lt* comprise a portion 152*lt*1 for letters "QR CODE" (a trademark), the two-dimensional barcode reading window 152*tw*, portions 152*lt*2 and 152*lt*3 provided along the upper side and the lower side of the two-dimensional barcode reading window 152*tw*, portions 152*lt*4 and 152*lt*5 provided above and below the contactless IC card reading surface 152R, a portion 152*lt*6 for letters "BILL INSERTION SLOT" and "INSERT ONE BILL AT A TIME", a portion 152*lt*7 for an image depicting bills, and a linear portion 152*lt*8 above "BILL INSERTION SLOT".

Light diffusion printing is performed on the portion 152*lt*1 for the letters "QR CODE" (a trademark), the portions 152*lt*2 and 152*lt*3 provided along the upper side and the lower side of the two-dimensional barcode reading window 152*tw*, the portions 152*lt*4 and 152*lt*5 provided above and below the contactless IC card reading surface 152R, the portion 152*lt*6 for letters "BILL INSERTION SLOT" and "INSERT ONE BILL AT A TIME", the portion 152*lt*7 for an image depicting bills, and the linear portion 152*lt*8 above "BILL INSERTION SLOT". Black PET films are formed by insert molding in two end portions (portions illustrated in black) of the liner portion 152*lt*8 above "BILL INSERTION SLOT" so as to gradually decrease the amount of transmitted light.

The two-dimensional barcode reading window 152*tw* is left transparent. The portions 152*lt*4 and 152*lt*5 provided above and below the contactless IC card reading surface 152R, through which light from light emission means of the contactless IC card reader/writer 127 is transmitted, are left transparent as well. Letters "INTERCOM" and "CALL" are printed in white.

Figure 12:
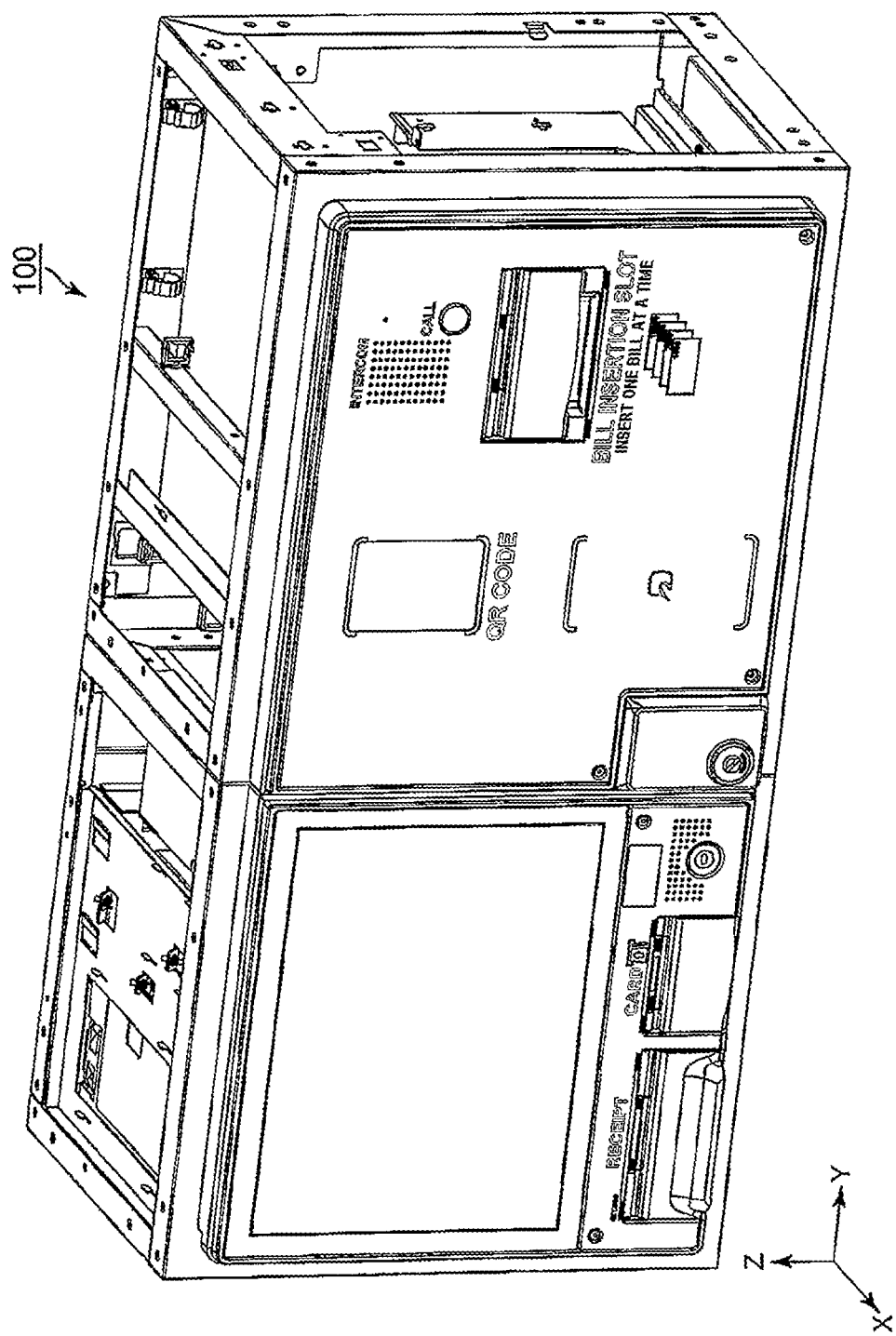
FIG. 12 is a perspective view of the outdoor terminal device (outdoor apparatus) illustrated in FIG. 1.
Figure 13:
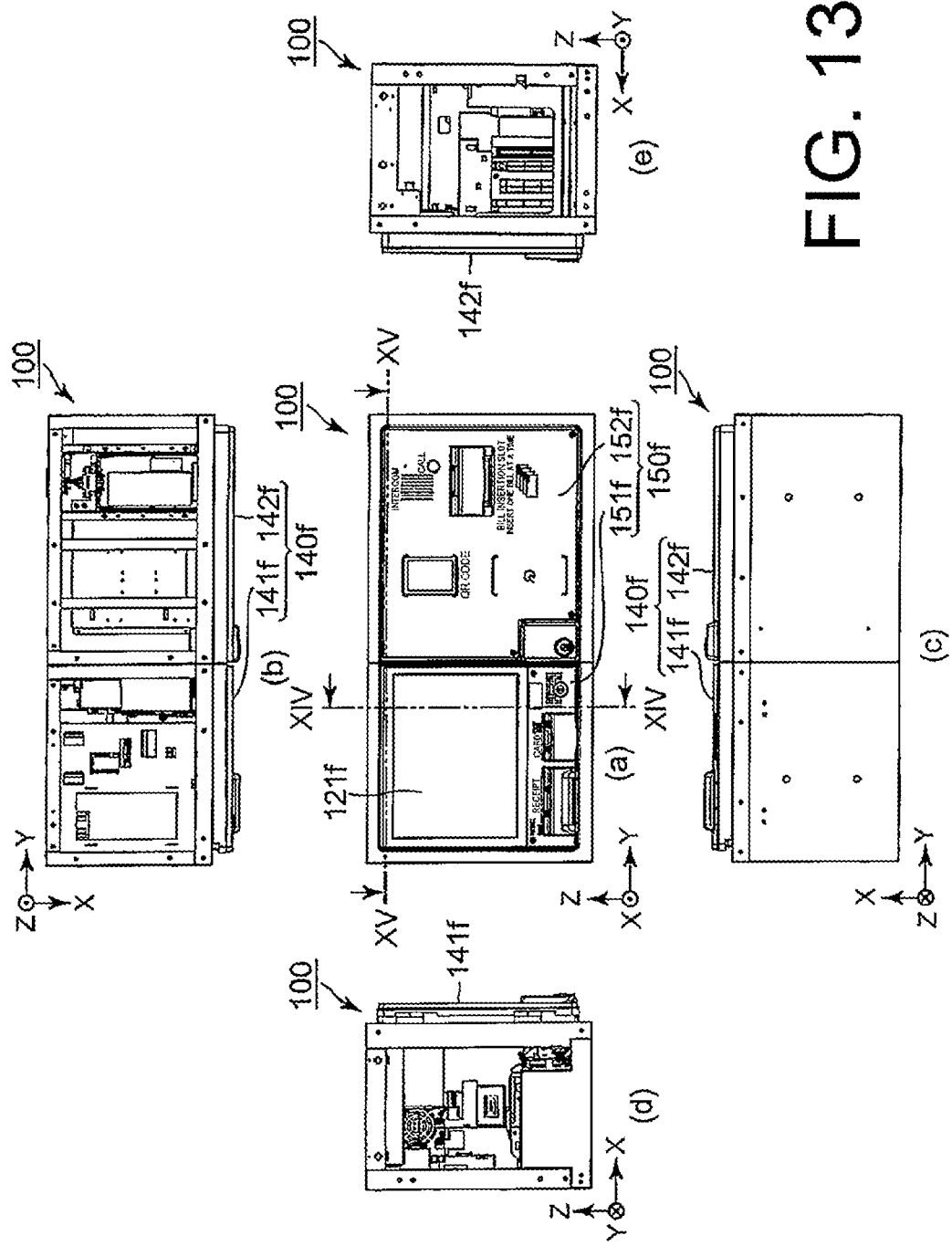
FIGS. 13 includes (a), (b), (c), (d), and (e) which are a front view, top view, bottom view, left side view, and right side view of the outdoor terminal device (outdoor apparatus) illustrated in FIG. 1, respectively.
Figure 14:
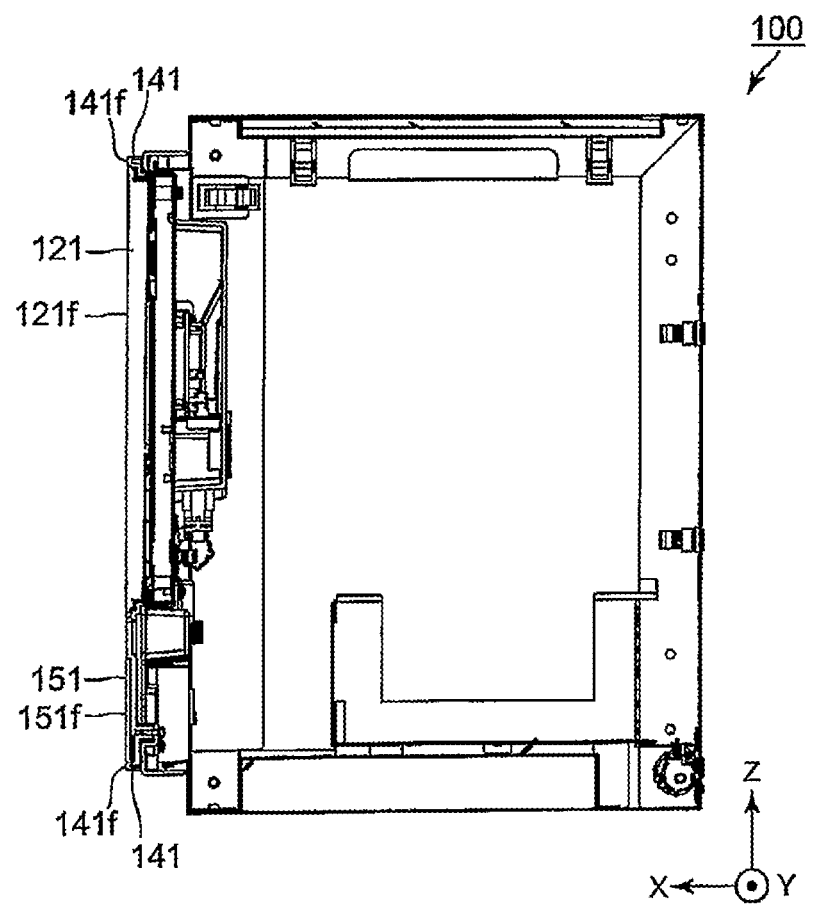
FIG. 14 is a sectional view taken along the line XIV-XIV of FIG. 13.
Figure 15:
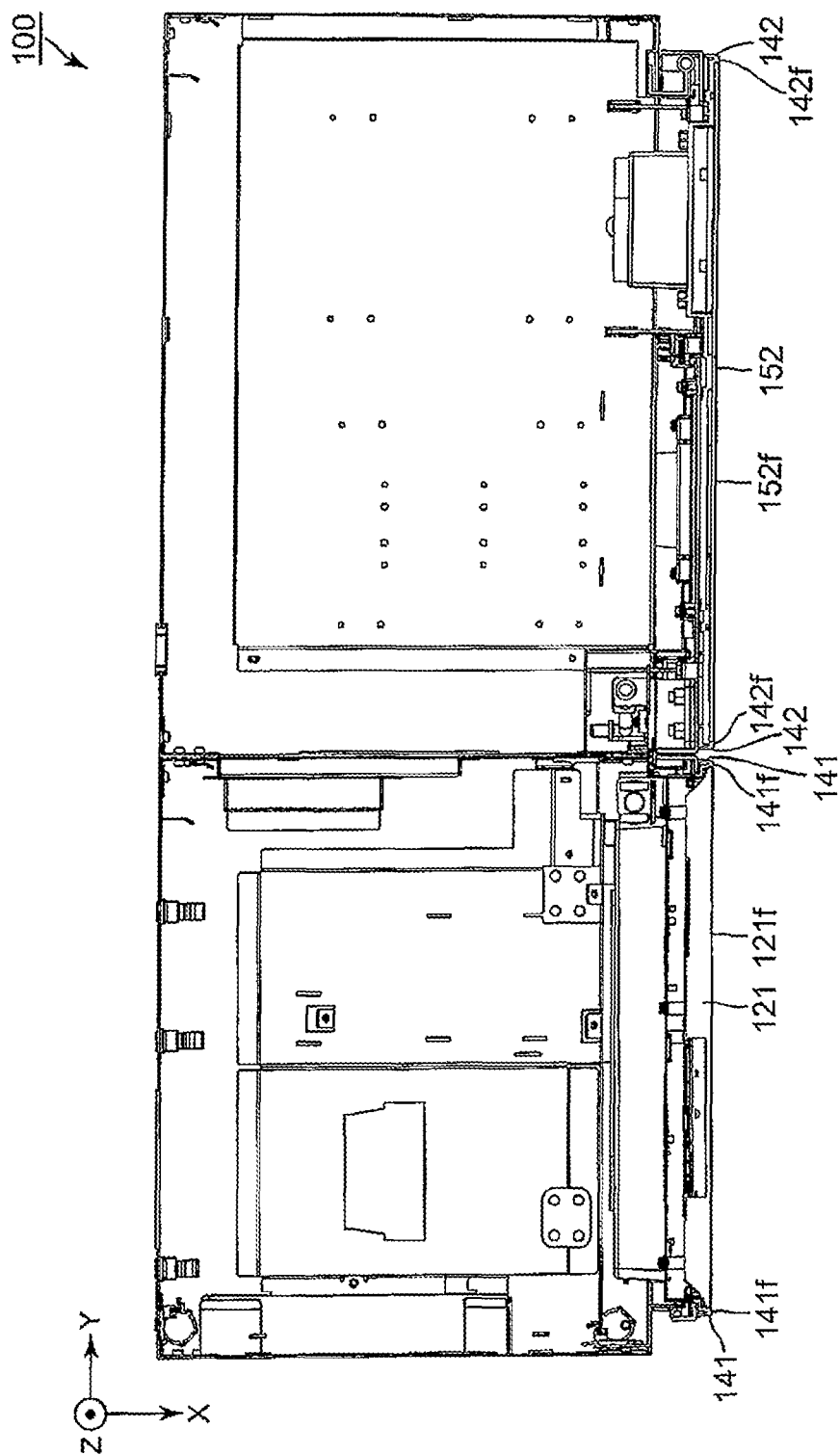
FIG. 15 is a sectional view taken along the line XV-XV of FIG. 13.

FIG. 12 is a perspective view of the outdoor apparatus 100. In FIG. 13, (a), (b), (c), (d), and (e) are a front view, top view, bottom view, left side view, and right side view of the outdoor apparatus 100, respectively. FIG. 14 is a sectional view taken along the line XIV-XIV of FIG. 13 (a). The first cover 161 of the receipt slot 141R is not illustrated in FIG. 14, which is not a view on arrow. FIG. 15 is a sectional view taken along the line XV-XV of FIG. 13(a). The antitheft lock 182 is not illustrated in FIG. 15, which is not a view on arrow.

As is apparent from FIGS. 12 to 15, nothing juts forward beyond the front surface (140*f* and 150*f*) of the panel (140 and 150) between an operation surface 121*f* of the touch panel display 121 and the receipt slot 141R, between the operation surface 121*f* of the touch panel display 121 and the magnetic card insertion slot 141C, between the operation surface 121*f* of the touch panel display 121 and the two-dimensional barcode reading window 152*tw*, and between the operation surface 121*f* of the touch panel display 121 and the bill insertion slot 142B. Nothing juts forward beyond the front surface (140*f* and 150*f*) of the panel (140 and 150) also between the operation surface 121*f* of the touch panel display 121 and the contactless IC card reading surface 152R, although a part of a portion above the antitheft lock 182 is required to be avoided.

That is, no projections are provided on the front surface (140*f* and 150*f*) of the panel (140 and 150) between the operation surface 121f of the touch panel display 121 and the function securement areas (151R, 151C, 151P, 151ph, 151lh, 152B, 152ish, 152ihi, 152iho, and 152p1), which are provided in edge portions of the panels (140 and 150). In other words, no projections jutting forward beyond a plane on which the operation surface 121f of the touch panel display 121 is located are present in a range in which a user operating the outdoor apparatus 100 moves his/her hand.

The operation surface 121f of the touch panel display 121, a front surface 151f of the first additional panel 151 attached to the first base panel 141 of the first door 131, a front surface 141f of a frame portion formed in the first base panel 141 as a frame around the operation surface 121f of the touch panel display 121 and around the first attached panel 151, a front surface 152f of the second additional panel 152 attached to the second base panel 142 of the second door 132, and a front surface 142f of a frame portion formed in the second base panel 142 as a frame around the second attached panel 152 are all on the same plane in the depth direction X.

In short, the operation surface 121f of the touch panel display 121 and the front surfaces (140f and 150f) of the panel (140 and 150) are on the same plane in the depth direction X.

The touch panel display 121 is flat throughout and has no level differences. A gap between the first door 131 and the second door 132 has dimensions that prevent the entrance of a finger. A user can accordingly move his/her hand without obstruction after operating the touch panel display 121 to take an action corresponding to the operation.

The two-dimensional barcode reading window 152tw of the two-dimensional barcode reader 126, which is not required to be partially exposed in order to implement its function (execute requested processing), is provided between the operation surface 121f of the touch panel display 121 and the bill insertion slot 142B. An apparatus requiring to be partially exposed in order to implement its function (execute requested processing), too, may be provided between the operation surface 121f and the bill insertion slot 142B as long as no part of the apparatus juts forward beyond the front surface (140f and 150f) of the panel (140 and 150). The bill insertion slot 142B of the bill receiving apparatus 128, which is an apparatus requiring to be partially exposed in order to implement its function (execute requested processing), is provided in a right edge portion of the panel (140 and 150). An apparatus not requiring to be partially exposed in order to implement its function (execute requested processing) may be provided in the right edge portion of the panel (140 and 150).

The antitheft lock 182 in the example embodiment is provided so as to jut forward beyond the front surface (140f and 150f) of the panel (the additional panel 150 and the frame portions of the base panel 140) in the depth direction X by design, for the purpose of making the key slot stand out. The antitheft lock 182 may instead be provided on the same plane as the front surface (140f and 150f) of the panel (140 and 150), or so as to form a dent behind the front surface (140f and 150f) of the panel (140 and 150). The first cover 161 of the receipt slot 141R in the example embodiment is provided so that a lower portion of the first cover 161 juts forward beyond the front surface (140f and 150f) of the panel (140 and 150). The first cover 161 may instead be provided on the same plane as the front surface (140f and 150f) of the panel (140 and 150), or so as to form a dent behind the front surface (140f and 150f) of the panel (140 and 150).

Referring to FIGS. 16 to 22, the description will proceed to other features of the outdoor apparatus 100 comprising the panel (140 and 150) on the door 130.

Figure 16:
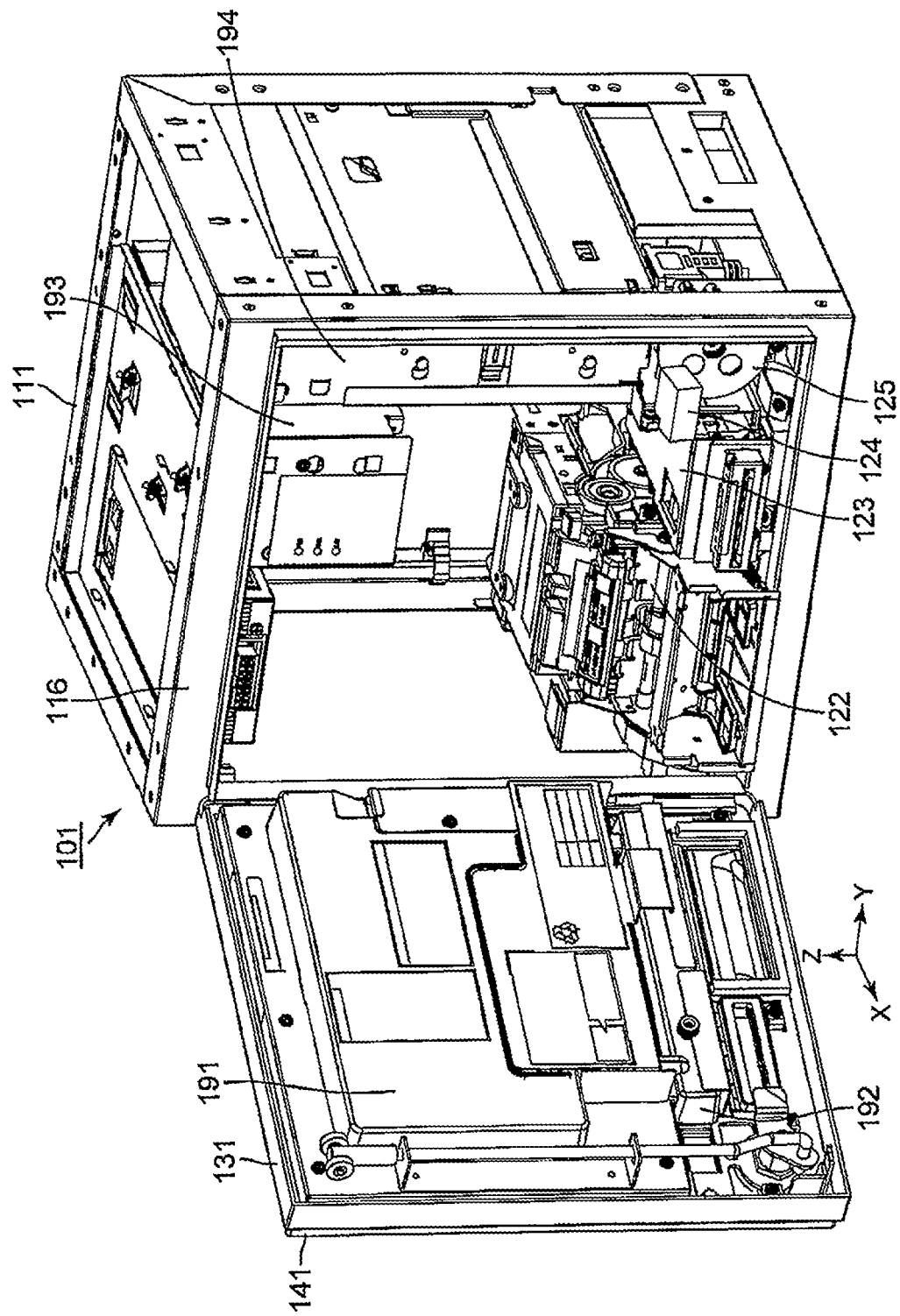
FIG. 16 is a perspective view for illustrating only a first division unit, out of components of the outdoor terminal device (outdoor apparatus) illustrated in FIG. 1, with a first door opened.

FIG. 16 is a perspective view for illustrating only the first division unit 101 with the first door 131 opened.

The touch panel display 121, a touch panel display control unit (a board assembly: a substrate on which electronic parts and the like are installed) 191, the light emission unit (board assembly) 171 for the receipt printer (see FIG. 3), the light emission unit (board assembly) 172 for the magnetic card reader (see FIG. 3), and the lock 180 (see FIG. 1) are attached to the first door 131. The light emission unit (board assembly) 171 for the receipt printer and the light emission unit (board assembly) 172 for the magnetic card reader are stored in a first light emission unit case 192.

The receipt printer 122, the magnetic card reader 123, the human presence sensor 124, the speaker 125, a power source unit 193, and a main board box 194 are housed in the first frame 116. The main board box 194 has a built-in main board (board assembly), which is a control unit 199 (see FIG. 18) of the outdoor apparatus 100. The main board box 194, connection cables of the respective apparatus, and the like are not shown.

Figure 17:
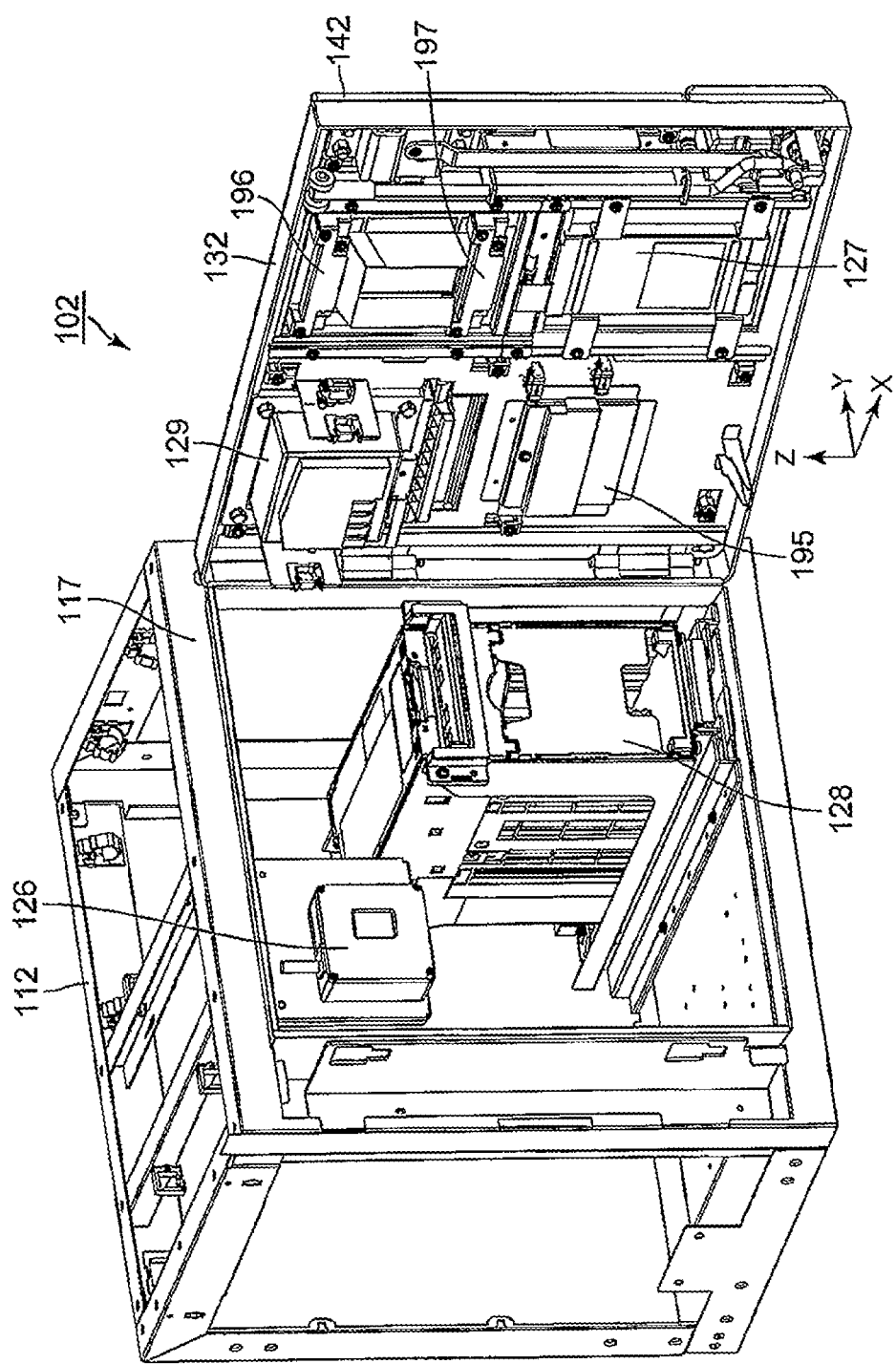
FIG. 17 is a perspective view for illustrating only a second division unit, out of components of the outdoor terminal device (outdoor apparatus) illustrated in FIG. 1, with a second door opened.

FIG. 17 is a perspective view for illustrating only the second division unit 102 with the second door 132 opened.

The contactless IC card reader/writer 127, the light emission unit (board assembly) 173 for the bill receiving apparatus (see FIG. 3), the light emission unit (board assembly) 174 for the two-dimensional barcode reader (see FIG. 3), the interphone 129, and the antitheft lock 182 (see FIG. 1) are attached to the second door 132. The light emission unit (board assembly) 173 for the bill receiving apparatus is stored in a second light emission unit case 195. The light emission unit (board assembly) 174 for the two-dimensional barcode reader is divided into two units, namely, an upper unit above the two-dimensional barcode reading window 152tw and a lower unit below the two-dimensional barcode reading window 152tw, and the upper unit and the lower unit are housed in a third light emission unit case 196 and a fourth light emission unit case 197, respectively.

The bill receiving apparatus 128 and the two-dimensional barcode reader 126 are housed in the second frame 117. Connection cables of the respective apparatus and the like are not shown.

Figure 18:
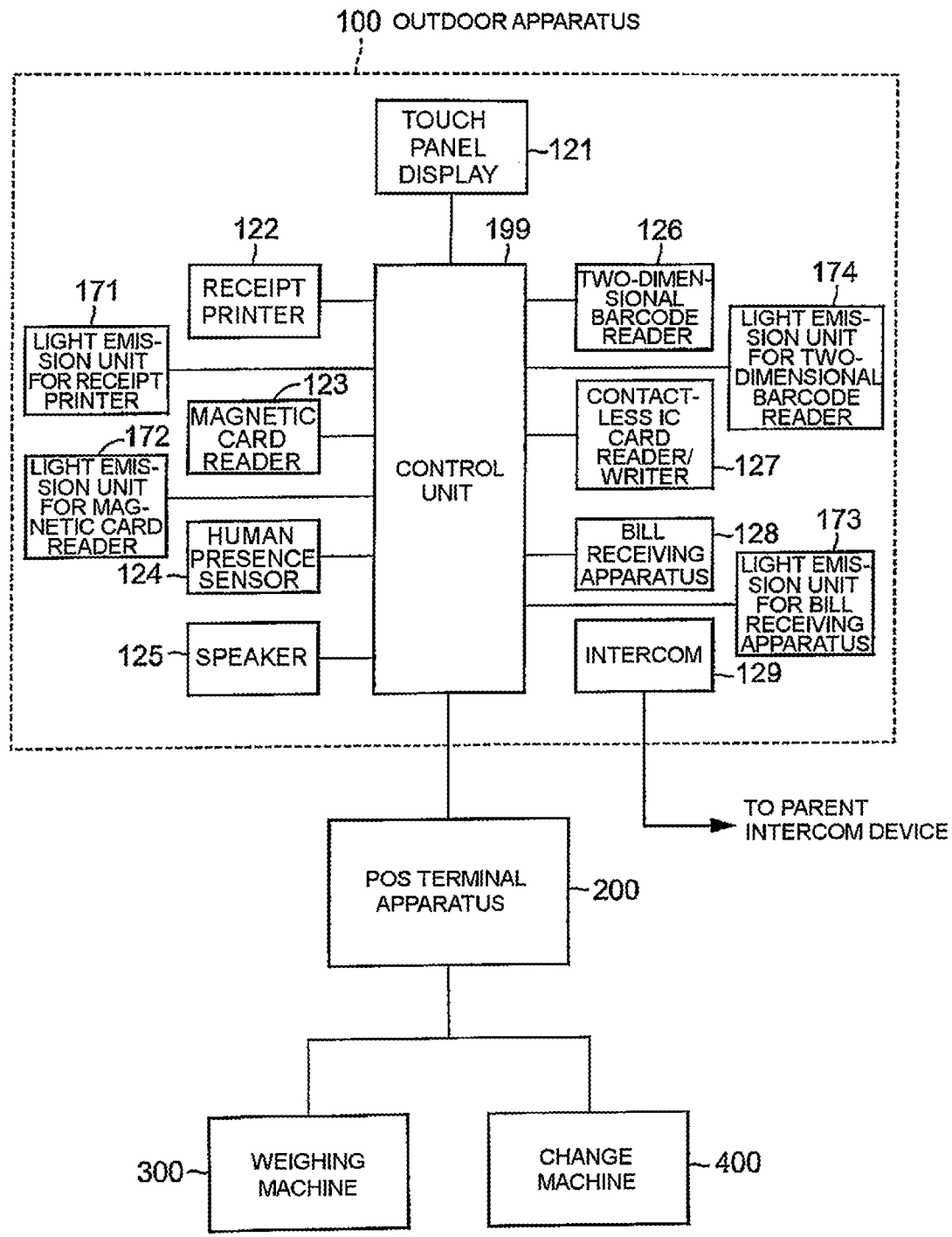
FIG. 18 is a block diagram for outlining the electrical configuration of a system for self-service gas stations, which includes the outdoor terminal device (outdoor apparatus) illustrated in FIG. 1.

FIG. 18 is a block diagram for outlining the electrical configuration of the system for self-service gas stations. A more detailed electrical configuration of the outdoor apparatus 100 is described.

The system for self-service gas stations comprises the outdoor terminal device (outdoor apparatus) 100, a point-of-sales (POS) terminal apparatus 200, a weighing machine 300, and a change machine 400.

A control unit (not shown) of the POS terminal apparatus 200 performs overall control of the system. The control unit of the POS terminal apparatus 200 transmits/receives data to/from the control unit 199 of the outdoor apparatus 100, to which the POS terminal apparatus 200 is connected by a local area network (LAN, a TCP/IP protocol), and transmits/receives data to/from a control unit (not shown) of the weighing machine 300 and a control unit (not shown) of the change machine 400, to which the POS terminal apparatus 200 is connected by a service station local area network (SS-RAN, an RS485 protocol).

The control unit 199 of the outdoor apparatus 100 controls processing of specifying fueling conditions and the method of payment of a fuel charge, processing of settling a fuel charge, and the like. The control unit of the weighing machine 300 controls processing of fueling a car or other vehicles. The control unit of the change machine 400 controls processing of giving a change to a user.

Next, the outdoor apparatus 100 will be described in more detail. The control unit 199 of the outdoor apparatus performs overall control of the outdoor apparatus 100. The control unit 199 of the outdoor apparatus requests the respective housed apparatuses to execute processing as required at the time of fueling. A light emission unit is provided for a housed apparatus in which no light emission unit is included.

In the case of a housed apparatus without a light emission unit, the control unit 199 of the outdoor apparatus requests the housed apparatus to execute processing, and also controls a light emission unit for the housed apparatus so that light is emitted. When the requested processing of the housed apparatus is finished, the control unit 199 controls the light emission unit so that light is dimmed.

In the case of a housed apparatus including a light emission unit, when the control unit 199 of the outdoor apparatus requests the housed apparatus to execute processing, the housed apparatus causes its light emission unit to emit light and, once the requested processing is finished, causes its light emission unit to dim light.

The control unit 199 of the outdoor apparatus transmits/receives necessary data to/from the control unit (not shown) of the POS terminal apparatus 200.

The touch panel display 121 displays necessary information and receives input of a user's operation during fueling. The touch panel display 121 has a backlight function.

When the control unit 199 of the outdoor apparatus requests the receipt printer 122 to print a receipt, the receipt printer 122 prints out and delivers the receipt. At the same time as issuing the request to print a receipt, the control unit 199 of the outdoor apparatus controls the light emission unit 171 for the receipt printer so that light is emitted. The light from the light emission unit 171 for the receipt printer is emitted from the linear portion 151lt2 above the receipt slot 141R, the portion 151lt1 for the letters "RECEIPT" on the first additional panel 151, and the receipt slot 141R (see FIG. 8).

When the control unit 199 of the outdoor apparatus requests the magnetic card reader 123 to read a magnetic card and a magnetic card is inserted, the magnetic card reader 123 reads necessary information out of the magnetic card. At the same time as issuing the request to read a magnetic card, the control unit 199 of the outdoor apparatus controls the light emission unit 172 for the magnetic card reader so that light is emitted. The light from the light emission unit 172 for the magnetic card reader is emitted from the linear portion 151lt5 above the magnetic card insertion slot 141C on the first attached panel 151, the portion 151lt3 for the letters "CARD", and the portion 151lt4 for the image depicting how a card is inserted (see FIG. 8). The magnetic card reader 123 reads, for example, a membership card or a credit card.

The human presence sensor 124 detects a user (person).

The speaker 125 produces a sound as required during fueling.

When the control unit 199 of the outdoor apparatus requests the two-dimensional barcode reader 126 to read a two-dimensional barcode and a two-dimensional barcode is held over the two-dimensional barcode reading window 152tw, the two-dimensional barcode reader 126 irradiates the two-dimensional barcode with light to read necessary information out of the two-dimensional barcode. At the same time as requesting the two-dimensional barcode reader 126 to read a two-dimensional barcode, the control unit 199 of the outdoor apparatus controls the light emission unit 174 for the two-dimensional barcode reader so that light is emitted. The light from the light emission unit 174 for the two-dimensional barcode reader is emitted from the portion 152lt1 for the letters "QR CODE" on the second attached panel 152, and the portions 152lt2 and 152lt3 provided along the upper side and the lower side of the two-dimensional barcode reading window 152tw (see FIG. 10). The two-dimensional barcode reader 126 reads, for example, a two-dimensional barcode of a charge discount coupon printed on a receipt.

When the control unit 199 of the outdoor apparatus requests the contactless IC card reader/writer 127 to read a contactless IC card and a contactless IC card is held over the contactless IC card reading surface 152R, the contactless IC card reader/writer 127 reads necessary information out of the contactless IC card. The contactless IC card reader/writer 127 causes a light emission unit included in itself to emit light when requested by the control unit 199 of the outdoor apparatus to read a contactless IC card. The light from the light emission unit of the contactless IC card reader/writer 127 is emitted from the portions 152lt4 and 152lt5 provided above and below the contactless IC card reading surface 152R (see FIG. 10). The contactless IC card reader/writer 127 reads and writes, for example, electronic money.

When the control unit 199 of the outdoor apparatus requests the bill receiving apparatus 128 to take in a bill and a bill is inserted to the bill insertion slot 142B, the bill receiving apparatus 128 takes in the bill. At the same time as requesting the bill receiving apparatus 128 to take in a bill, the control unit 199 of the outdoor apparatus controls the light emission unit 173 for the bill receiving apparatus so that light is emitted. The light from the light emission unit 173 for the bill receiving apparatus is emitted from the linear portion 152lt8 below the bill insertion slot 142B on the second attached panel 152, the portion 152lt6 for the letters "BILL INSERTION SLOT" and "INSERT ONE BILL AT A TIME", and the portion 152lt7 for the image depicting bills (see FIG. 10).

The switch of the intercom 129 is operated as required during fueling, to be supplied with voice to a microphone, and voice is produced from the speaker. The intercom 129 is connected to a parent intercom device (not shown) installed in an office of the gas station, and enables communication to and from the parent intercom device.

Figure 19:
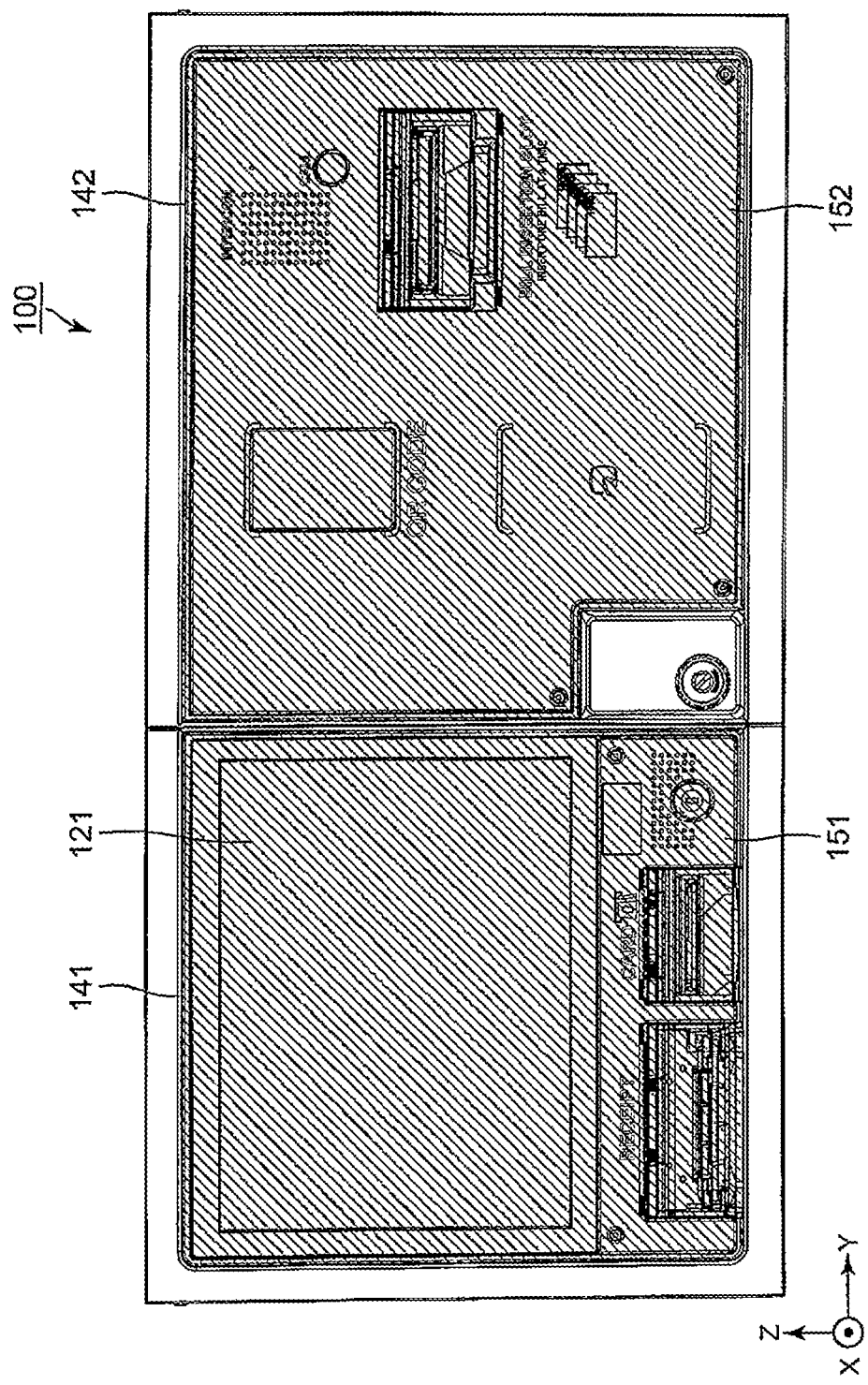
FIG. 19 is a front view of the outdoor terminal device (outdoor apparatus) illustrated in FIG. 1 in a standby state prior to a user's operation of the outdoor apparatus.

FIG. 19 is a diagram for illustrating a state in which light emission units of housed apparatus housed in the outdoor apparatus 100 and light emission units for housed apparatus are all unlit, namely, a standby state of the outdoor apparatus 100 prior to a user's operation of the outdoor apparatus 100. The interior of the outdoor apparatus 100 visible through the transparent two-dimensional barcode reading window 152tw is omitted from FIG. 19.

A backlight of the touch panel display 121 is unlit, and the touch panel display 121 is black outside an area receptive of input by touch. The first additional panel 151 and the second additional panel 152 are black except in light-transmissive portions, which are all in an unlit state. The first base panel 141 and the second base panel 142 are black. No light is emitted from any place on the first base panel 141 and the second base panel 142. In FIG. 19, the unlit state is indicated by hatching the first base panel 141 and the second base panel 142.

Figure 20:
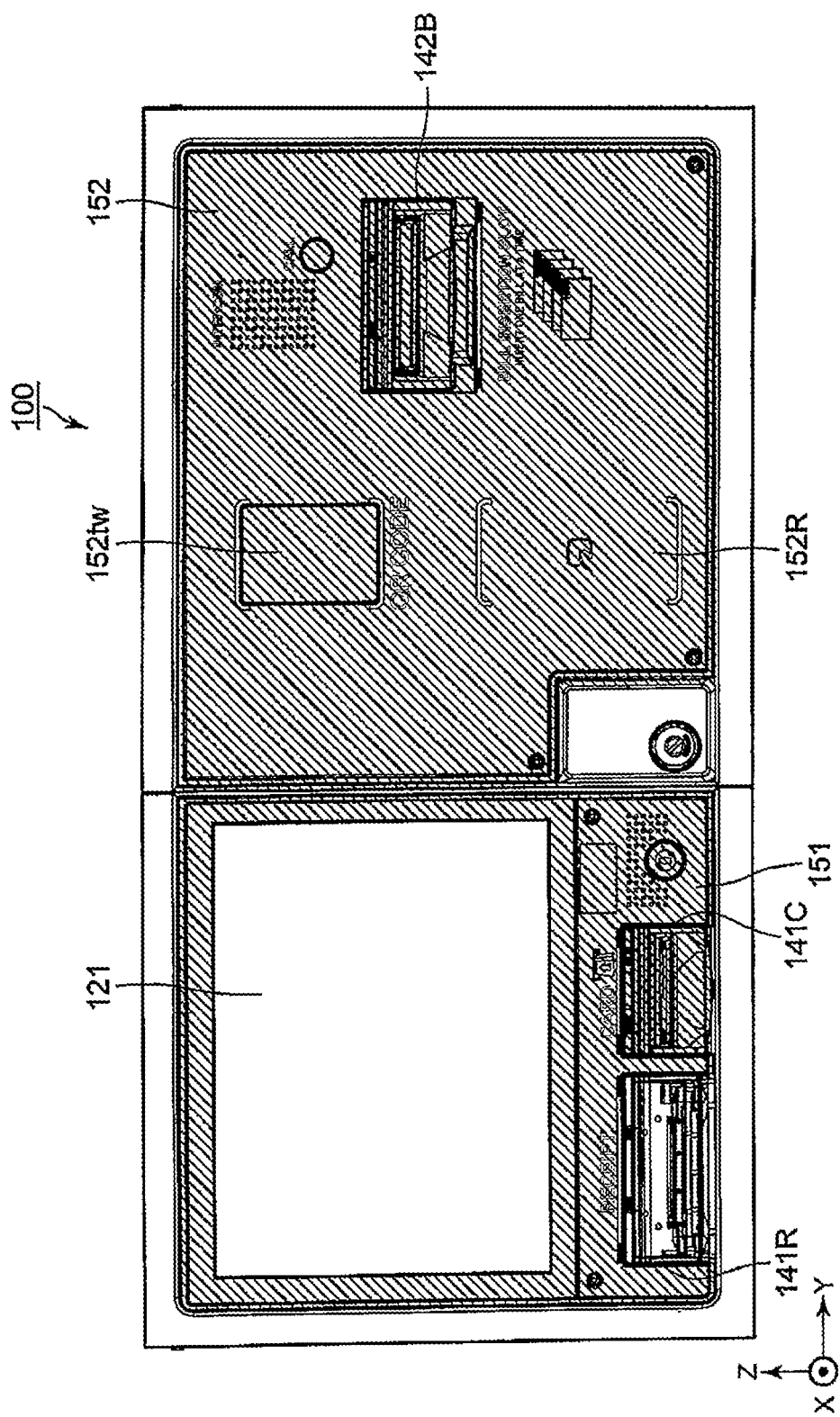
FIG. 20 is a front view for illustrating a shift of the outdoor apparatus from the standby state illustrated in FIG. 19 to a state in which all light emission units are lit.
Figure 21:
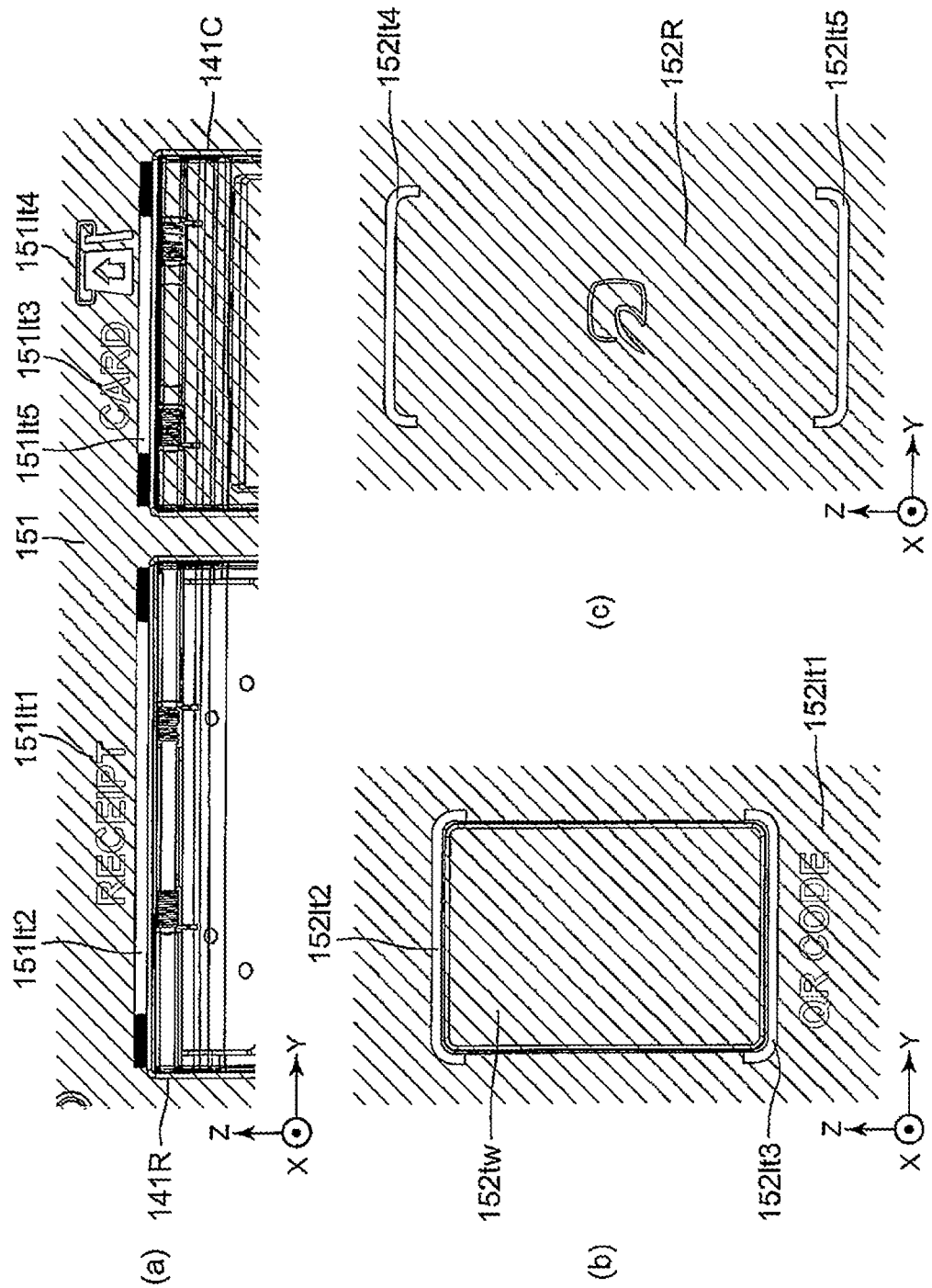
FIG. 21 includes partial enlarged views of FIG. 20 in which (a) is a partial enlarged view of a portion above a receipt slot and a magnetic card insertion slot, (b) is a partial enlarged view of a portion around a two-dimensional bar-code reading window, and (c) is a partial enlarged view of a portion around a contactless IC card reading surface.
Figure 22:
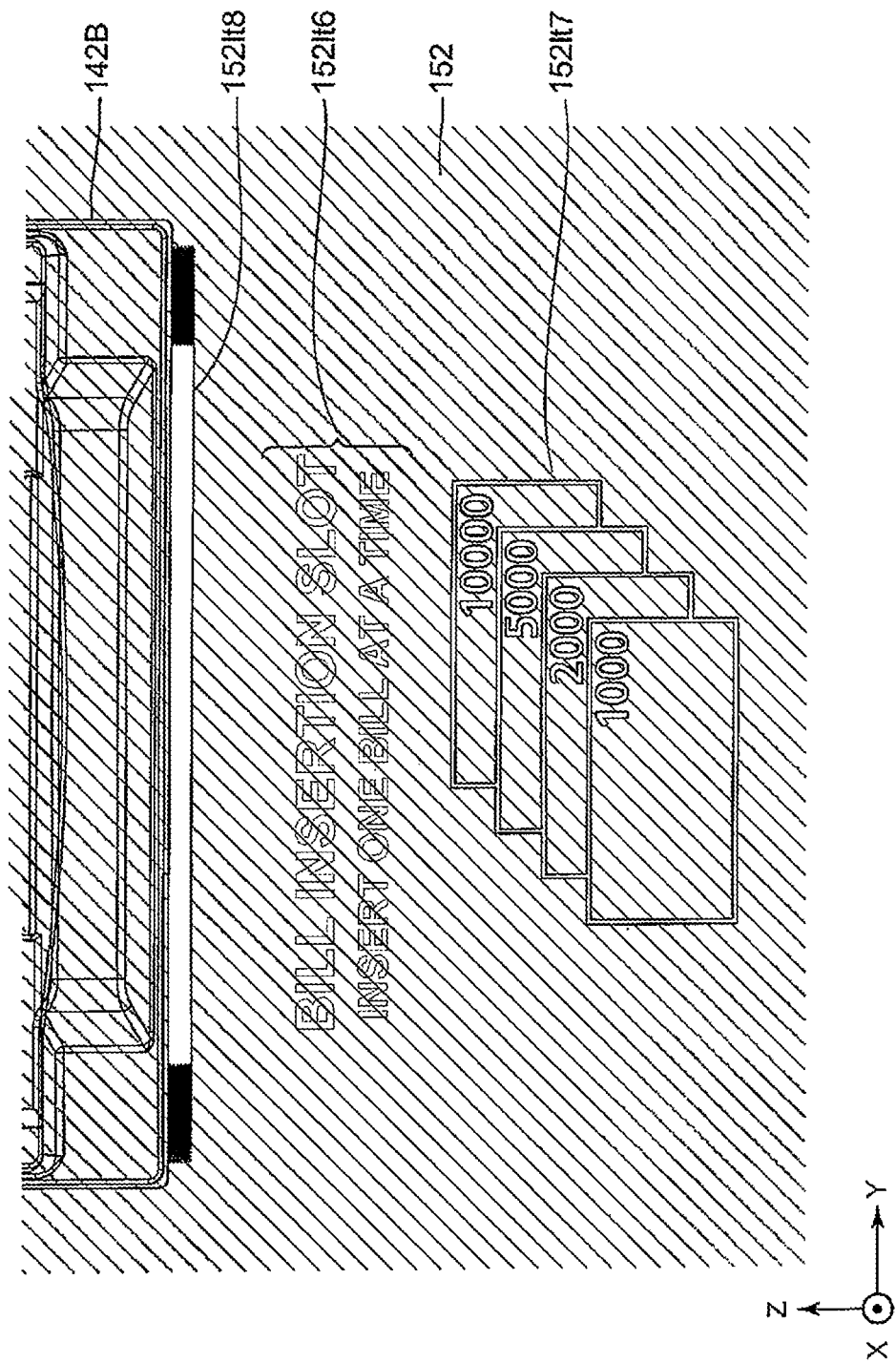
FIG. 22 is a partial enlarged view of a portion below a bill insertion slot of FIG. 20.

FIG. 20 is a diagram for illustrating a state in which all light emission units for housed apparatus housed in the outdoor apparatus 100 and all light emission units of housed apparatus that include light emission means are lit, and portions from which light is emitted are illustrated as white shapes on a dark background. FIG. 21 and FIG. 22 are partial enlarged views of the outdoor apparatus 100 in this state. FIG. 21 (a) is an enlarged view of a portion above the receipt slot 141R and the magnetic card insertion slot 141C, FIG. 21 (b) is an enlarged view of a portion around the two-dimensional barcode reading window 152tw, and FIG. 21 (c) is an enlarged view of a portion around the contactless IC card reading surface 152R. FIG. 22 is an enlarged view of a portion below the bill insertion slot 142B. The interior of the outdoor apparatus 100 visible through the transparent two-dimensional barcode reading window 152tw is omitted from the drawings. The illustrated two-dimensional barcode reading window 152tw is not in a lit state (is not illustrated as a white shape on a dark background) because the two-dimensional barcode reader 126 irradiates a two-dimensional barcode with light when the two-dimensional barcode is held over the two-dimensional barcode reading window 152tw.

The backlight of the touch panel display 121 is lit. All light emission units for housed apparatus are in a blue light lit state in which blue light is emitted, and light emission units of housed apparatus are in a blue light lit state in which blue light is emitted. The backlight of the touch panel display 121 enters a lit state in which the human presence sensor 124 detects a person to display information necessary for fueling operation, and enters an unlit state when a predetermined period of time has elapsed after the human presence sensor 124 no longer detects a person.

FIG. 20 is a diagram for illustrating a state in which all light emission units for housed apparatus and all light emission units of housed apparatus that include light emission means are in a lit state, and a case in which all light emission units for housed apparatus and all light emission units of housed apparatus that include light emission means are in a lit state concurrently does not occur while the outdoor apparatus 100 is in use. In actual operation, light is emitted only from the light emission unit for a housed apparatus, or the light emission unit of a housed apparatus, relevant to an action required to be taken as an action corresponding to operation that is performed on the touch panel display 121, for example, while the backlight is lit.

Referring to FIG. 21 (a), description about the first additional panel 151 will be given next. In the illustrated state, blue light is emitted (blue light is lighting) from the portion 151lt1 for the letters "RECEIPT" above the receipt slot 141R and from the linear portion 151lt2 below the letters "RECEIPT", and from the receipt slot 141R. Blue light is emitted (blue light is lighting) also from the portion 151lt3 for the letters "CARD" above the magnetic card insertion slot 141C, the portion 151lt4 for the image depicting how a card is inserted, and the linear portion 151lt5 below the letters "CARD".

A description about the second attached panel 152 will be given next. In the state illustrated in FIG. 21 (b), blue light is emitted (blue light is lighting) from the portion 152lt1 for the letters "QR CODE", and the portions 152lt2 and 152lt3 provided along the upper side and the lower side of the two-dimensional barcode reading window 152tw. In the state illustrated in FIG. 22, blue light is emitted (blue light is lighting) from the linear portion 151lt8 provided below the bill insertion slot 142B, the portion 152lt6 for the letters "BILL INSERTION SLOT" and "INSERT ONE BILL AT A TIME", and the portion 152lt7 for the image depicting bills. In the state illustrated in FIG. 21 (c), blue light is emitted (blue light is lighting) from the portions 152lt4 and 152lt5 provided along the upper side and the lower side of the contactless IC card reading surface 152R.

During fueling, light is emitted only from the light emission unit for a housed apparatus, or the light emission unit of a housed apparatus, relevant to an action required to be taken as an action corresponding to operation that is performed on the touch panel display 121, for example, thus creating a state in which blue light is emitted (blue light is lighting) on a black panel as illustrated in FIGS. 20 to 22. A user can accordingly recognize by sight a housed apparatus relevant to an action to be taken with ease even in daylight.

The example embodiment, in which the panel comprises the base panel 140 and the additional panel 150, has the following effects.

A pattern or the like can be printed in a range in which the visual recognition of light from the light emission units for housed apparatus and the light emission units of housed apparatus is not obstructed on the additional panel 150, to thereby create a design unique to each customer.

The additional panel 150, which is detachable, can be cleaned easily when the additional panel becomes dirty.

This invention is not limited to the example embodiment, and various modifications can be made thereto without departing from the technical scope described in the claims in this application.

For instance, the housed apparatuses described in the example embodiment are merely an example, and one or more of the housed apparatuses described in the example embodiment may not be housed, or apparatus other than the housed apparatuses described in the example embodiment may be housed in addition to the housed apparatuses described in the example embodiment. One or more of the housed apparatuses described in the example embodiment may be replaced with other apparatus to be housed.

In the example embodiment described above, in which the outdoor apparatus 100 has the double door 130, two panels, namely, the first panel comprising the first additional panel 151 and the first base panel 141 and the second panel comprising the second additional panel 152 and the second base panel 152, are provided. The outdoor apparatus may have a single door to use one panel instead of two panels.

Each additional panel 150 in the example embodiment is made of a transparent resin-made article created by covering a portion through which light is not to be transmitted with a black PET film. The additional panel may be made of a bi-colored molded article obtained by forming a portion through which light is not to be transmitted from black resin and forming a portion through which light is to be transmitted from transparent resin.

While portions of the additional panel 150 through which light is not to be transmitted are covered with black PET films in the example embodiment, the PET films may have other dark colors, for example, dark brown or dark navy. Blue light emitted from the light emission units in the example embodiment may be replaced with light having other conspicuous colors, for example, green or red.

While the panel comprises the additional panel 150 and the base panel 140 in the example embodiment, the additional panel and the base panel may be integrated into a single unitary panel. The panel in this case is made of a transparent resin-made article created by covering a portion through which light is not to be transmitted with a PET film of black color or other dark colors, or made of a bi-colored molded article obtained by forming a portion through which light is not to be transmitted from resin of black or other dark colors and forming a portion through which light is to be transmitted from transparent resin.

The outdoor apparatus 100 in the example embodiment is a component of a system for self-service gas stations. The outdoor apparatus may also be a component of a system for a gas station in which staff at the gas station performs fueling operation.

The example embodiment takes an outdoor apparatus in a self-service fueling system as an example of the outdoor terminal device. However, this invention is applicable to outdoor terminal devices installed outdoors in general.

This application is based upon and claims the benefit of priority from Japanese Patent Application No. 2016-000470, filed on Jan. 5, 2016, the disclosure of which is incorporated herein in its entirety by reference.

REFERENCE SIGNS LIST 100 outdoor terminal device (outdoor apparatus)
101 first division unit (first separation unit)
102 second division unit (second separation unit)
110 housing
110f front surface
111 first housing
112 second housing
116 first frame
117 second frame
121 touch panel display
121f operation surface
122 receipt printer
123 magnetic card reader
124 human presence sensor
125 speaker
126 two-dimensional barcode reader
127 contactless IC card reader/writer
128 bill receiving apparatus
129 intercom
130 double door
131 first door
132 second door
140 base panel
140f front surface
141 first base panel
141f front surface
141R receipt slot
141C magnetic card insertion slot
141cc recessed portion
141sh threaded hole
141h1 first hole portion
141h2 second hole portion
141bh threaded hole
141dh hole portion for touch panel display
141rh hole portion for receipt slot
141ch hole portion for magnetic card insertion slot
141hh hole portion for human presence sensor
141ph hole portion for speaker
141lh hole portion for lock
142 second base panel
142f front surface
142B bill insertion slot
142sh threaded hole
142h1 hole portion for light emission unit for bill receiving apparatus
142bh threaded hole
142bih hole portion for two-dimensional barcode reader and contactless IC card reader/writer
142ph hole portion for bill insertion slot
142ih hole portion for interphone
150 additional panel
150f front surface
151 first additional panel
151f front surface
151cv engagement projection portion
151sh hole for fastening with screw
151R first function securement area
151C second function securement area
151P third function securement area
151ph fourth function securement area (plurality of holes)
151lh fifth function securement area
151lt light-transmissive portion
151lt1 to 151lt5 light-transmissive portion
152 second additional panel
152f front surface
152cv engagement projection portion
152B sixth function securement area
152ish, 152ihi, 152iho seventh function securement area
152p1 eighth function securement area
152tw two-dimensional barcode reading window
152R contactless IC card reading surface
152m mark
152sh hole for fastening with screw
152lt light-transmissive portion
152lt1 to 152lt8 light-transmissive portion
161 first cover
162 second cover
163 third cover
171 light emission unit for receipt printer
172 light emission unit for magnetic card reader
173 light emission unit for bill receiving apparatus
174 light emission unit for two-dimensional barcode reader
180 lock
182 antitheft lock
191 touch panel display control unit
192 first light emission unit case
193 power source unit
194 main board box
195 second light emission unit case
196 third light emission unit case
197 fourth light emission unit case
199 control unit
200 point-of-sales (POS) terminal apparatus
300 weighing machine
400 change machine

The invention claimed is:

1. An outdoor terminal device, which includes a door provided with a touch panel display on a front surface of a housing of the outdoor terminal device, and is configured to house therein a plurality of housed apparatuses,
wherein the door includes a panel in a predetermined area,
wherein the predetermined area is an area excluding a display area and function securement areas, the display area being an area in which the touch panel display is provided, each of the function securement areas being required to partially expose at least one of the plurality of housed apparatuses to the front surface of the housing so that the at least one of the plurality of housed apparatuses is capable of implementing its function,
wherein an operation surface of the touch panel display and a front surface of the panel are on the same plane in a depth direction of the outdoor terminal device as a whole,
wherein no projections jutting forward beyond a plane on which the operation surface of the touch panel display is present, wherein at least one of the plurality of housed apparatuses is housed between the operation surface of the touch panel display and at least one of the function securement areas provided in the end portion of the panel, wherein a part of a surface in the panel corresponding to positions of the plurality of housed apparatuses in the depth direction are transmissive of light, and the surface of the panel excluding the part of the surface is not transmissive of light, wherein light generated in response to an operation performed on the touch panel display is transmitted through the part of the surface in the panel, and wherein, when one of the plurality of housed apparatuses is relevant to an action to be taken as an action corresponding to the operation performed on the touch panel display, and the one of the plurality of housed apparatuses includes no light emission means, light is generated by a light emission means provided for the one of the plurality of housed apparatuses.

2. An outdoor terminal device according to claim 1, wherein the door comprises a double door having a first door and a second door, and wherein the panel comprises a first panel for the first door and a second panel for the second door.

3. An outdoor terminal device according to claim 1, wherein the panel comprises a base panel attached to the door and an additional panel attached to the base panel.

4. An outdoor terminal device according to claim 1, wherein the outdoor terminal device comprises an outdoor apparatus of a system for a gas station.

* * * * *